(12) United States Patent
Hwang et al.

(10) Patent No.: US 11,702,161 B2
(45) Date of Patent: Jul. 18, 2023

(54) VEHICLE FOR UNEVEN TERRAIN

(71) Applicant: SAMSUNG ELECTRONICS CO., LTD., Suwon-si (KR)

(72) Inventors: Cheoggyu Hwang, Suwon-si (KR); Soonheum Ko, Suwon-si (KR); Youngdae Ko, Suwon-si (KR); Donghan Koo, Suwon-si (KR); Jinsoo Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/723,037

(22) Filed: Apr. 18, 2022

(65) Prior Publication Data

US 2022/0234662 A1 Jul. 28, 2022

Related U.S. Application Data

(63) Continuation of application No. PCT/KR2021/017760, filed on Nov. 29, 2021.

(30) Foreign Application Priority Data

Dec. 3, 2020 (KR) .................. 10-2020-0167813
Feb. 26, 2021 (KR) .................. 10-2021-0026677

(51) Int. Cl.
*B62D 61/04* (2006.01)
*B62D 61/02* (2006.01)
*B62D 49/06* (2006.01)

(52) U.S. Cl.
CPC ......... *B62D 61/02* (2013.01); *B62D 49/0678* (2013.01); *B62D 61/04* (2013.01); *B60G 2300/40* (2013.01)

(58) Field of Classification Search
CPC .... B62D 61/02; B62D 61/04; B62D 49/0678; B62D 21/14; A61G 5/06; A61G 5/061;
(Continued)

(56) References Cited

U.S. PATENT DOCUMENTS 4,775,021 A 10/1988 Marino
7,648,156 B2 * 1/2010 Johanson ............. A61G 5/1089
180/209
(Continued)

FOREIGN PATENT DOCUMENTS

CN 111846016 A * 10/2020
JP 2002-284049 A 10/2002
(Continued)

OTHER PUBLICATIONS

International Search Report dated Mar. 4, 2022 issued by the International Searching Authority in International Application No. PCT/KR2021/017760 (PCT/ISA/210).
(Continued)

*Primary Examiner* — Keith J Frisby
(74) *Attorney, Agent, or Firm* — Sughrue Mion, PLLC

(57) ABSTRACT

A vehicle for uneven terrain includes a main frame; a front wheel assembly disposed in front of the main frame with a front wheel; a rear wheel assembly disposed behind the main frame with a rear wheel; a wheelbase adjuster configured to adjust a wheelbase between the front wheel and the rear wheel; a first side wheel assembly disposed on one side of the main frame with a first side wheel; a second side wheel assembly disposed on another side of the main frame with a second side wheel; a front wheel torque transmitter configured to interlock vertical movements of the front wheel and the first side wheel; a rear wheel torque transmitter configured to interlock vertical movements of the rear wheel and the second side wheel; and a stabilizer configured to support
(Continued)

the first side wheel assembly and the second side wheel assembly.

20 Claims, 18 Drawing Sheets

(58) Field of Classification Search
CPC ............... A61G 5/063; B60G 2300/40; B60G 2300/402
USPC ................... 180/209, 21; 280/43.16
See application file for complete search history.

(56) References Cited

U.S. PATENT DOCUMENTS

| | | |
|---|---|---|
| 9,415,813 B2 | 8/2016 | Ahn et al. |
| 2009/0174168 A1 | 7/2009 | Pavlopoulos et al. |
| 2016/0009320 A1 | 1/2016 | Ahn et al. |

FOREIGN PATENT DOCUMENTS

| | | |
|---|---|---|
| JP | 2016-224654 A | 12/2016 |
| KR | 10-2003-0088947 A | 11/2003 |
| KR | 10-2012-0053236 A | 5/2012 |
| KR | 10-2012-0074467 A | 7/2012 |
| KR | 10-1339780 B1 | 12/2013 |
| KR | 10-1592729 B1 | 2/2016 |
| KR | 10-2006647 B1 | 8/2019 |
| KR | 10-2020-0007490 A | 1/2020 |
| WO | 2015/135986 A1 | 9/2015 |

OTHER PUBLICATIONS

Written Opinion dated Mar. 4, 2022 issued by the International Searching Authority in International Application No. PCT/KR2021/017760 (PCT/ISA/237).

* cited by examiner

VEHICLE FOR UNEVEN TERRAIN

CROSS-REFERENCE TO RELATED APPLICATIONS

This application is a bypass continuation of PCT Application No. PCT/KR2021/017760, filed on Nov. 29, 2021, which claims priority to Korean Patent Application No. 10-2020-0167813, filed on Dec. 3, 2020, and Korean Patent Application No. 10-2021-0026677, filed on Feb. 26, 2021, in the Korean Intellectual Property Office, the disclosures of which are incorporated by reference herein in their entireties.

BACKGROUND

1. Field

The disclosure relates to a vehicle capable of moving on various terrain, and more particularly, to a vehicle for uneven terrain in which a relative height of wheels is adjusted depending on a curvature of the terrain, and a wheelbase can be actively adjusted depending on the size of an obstacle.

2. Description of Related Art

Related art vehicles using wheels may transport goods using minimal power.

However, the related art vehicle using wheels may easily move on flat ground, but has a problem in that it is difficult to move up/down stairs.

In order to solve the problem, various vehicles have been developed.

For example, U.S. Patent Application Publication No. 2017/0015168 discloses a vehicle capable of climbing the stairs.

The vehicle according to the related art described above has at least four wheels, and has a structure in which two wheels are rotatably hinged to the base in pairs. Two pairs of wheels may rotate relative to the pivot point so that the vehicle can climb stairs.

However, the vehicle according to the related art has a problem in that it is impossible to climb the stairs in a direction perpendicular to the stairs when the distance between the wheels coincides with the step width of the stairs or the sum of a plurality of step widths.

In addition, because the side wheels are structured to generate forward and backward movements in opposite directions when moving up and down, when moving on uneven terrain, they do not go straight and inevitably cause yaw rotation or rolling rotation.

SUMMARY

Provided are a vehicle for uneven terrain in which each wheel can move up and down, and a wheelbase between a front wheel and a rear wheel can be varied so as to climb obstacles of various sizes including stairs.

According to an aspect of the disclosure, there is provided a vehicle including: a main frame; a front wheel assembly disposed in front of the main frame and including a front wheel; a rear wheel assembly disposed behind the main frame and including a rear wheel; a wheelbase adjuster disposed between the front wheel assembly and the rear wheel assembly and configured to adjust a wheelbase between the front wheel and the rear wheel; a first side wheel assembly pivotably disposed on one side of the main frame and including a first side wheel; a second side wheel assembly pivotably disposed on another side of the main frame and including a second side wheel that is opposite to the first side wheel; a front wheel torque transmitter configured to interlock a vertical movement of the front wheel and a vertical movement of the first side wheel; a rear wheel torque transmitter configured to interlock a vertical movement of the rear wheel and a vertical movement of the second side wheel; and a stabilizer disposed in the main frame and configured to support the first side wheel assembly and the second side wheel assembly so that the first side wheel and the second side wheel are positioned at a same height.

The wheelbase adjuster may include: a front wheel moving part configured to linearly move the front wheel assembly; and a rear wheel moving part disposed in parallel to the front wheel moving part and configured to linearly move the rear wheel assembly.

Each of the front wheel moving part and the rear wheel moving part may include a linear motion guide.

The front wheel moving part may include a front wheel rack disposed under the linear motion guide of the front wheel moving part, the rear wheel moving part may include a rear wheel rack disposed in parallel and opposite to the front wheel rack, and at least one pinion may be disposed between the front wheel rack and the rear wheel rack.

The front wheel torque transmitter may include: a spline shaft disposed parallel to and above the linear motion guide of the front wheel moving part; a first front wheel bevel gear disposed at a leading end of the spline shaft; and a second front wheel bevel gear disposed at a rear end of the front wheel assembly and meshed with the first front wheel bevel gear.

The front wheel assembly may be pivotably disposed at a front end of the front wheel moving part, the second front wheel bevel gear may be configured to rotate integrally with the front wheel assembly, and the front wheel may be rotatably disposed at a front end of the front wheel assembly.

The vehicle may further include a front shock absorber disposed between the front wheel moving part and the front wheel assembly.

The rear wheel torque transmitting device may include: a spline shaft disposed parallel to and above the linear motion guide of the rear wheel moving part; a first rear wheel bevel gear disposed at a leading end of the spline shaft; and a second rear wheel bevel gear disposed at a front end of the rear wheel assembly and meshed with the first rear wheel bevel gear.

The rear wheel assembly may be pivotably disposed at a rear end of the rear wheel moving part, the second rear wheel bevel gear may be configured to rotate integrally with the rear wheel assembly, and the rear wheel may be rotatably disposed at a rear end of the rear wheel assembly.

The vehicle may further include a rear shock absorber disposed between the rear wheel moving part and the rear wheel assembly.

The front wheel moving part may include a first linear motion guide that may include a block and a rail, the rear wheel moving part may include a second linear motion guide that may include a block and a rail, the block of the first linear motion guide and the block of the second linear motion guide may be disposed on the main frame, and the front wheel assembly may be pivotably disposed at one end of the rail of the first linear motion guide, and the rear wheel assembly is pivotably disposed at one end of the rail of the second linear motion guide.

The wheelbase adjuster may further include a locking device configured to lock the front wheel moving part and the rear wheel moving part such that a size of the wheelbase becomes fixed.

The front wheel moving part may include a front wheel rack, the rear wheel moving part may include a rear wheel rack disposed parallel and opposite to the front wheel rack, at least one pinion disposed between the front wheel rack and the rear wheel rack, and the locking device may be configured to selectively lock the at least one pinion.

The locking device may include: a lifting stopper configured to selectively lock the at least one pinion; and an actuator configured to move the lifting stopper up and down.

The at least one pinion may include a plurality of coupling grooves provided on an upper surface thereof, the lifting stopper may include: a moving plate configured to be moved up and down by the actuator and including a plurality of coupling protrusions that are configured to engage with the plurality of coupling grooves; a fixed plate disposed above the moving plate and spaced apart from the moving plate by a predetermined distance; and a plurality of elastic members provided between the moving plate and the fixed plate, and based on the moving plate being lowered by the actuator and the plurality of coupling protrusions being engaged with the plurality of coupling grooves of the at least one pinion, the at least one pinion may be locked so as to not rotate.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments of the disclosure will hereinafter be described with reference to the accompanying drawings. However, it is to be understood that embodiments of the present disclosure are not limited to the described example embodiments, and include various modifications, equivalents, and/or alternatives according to embodiments of the disclosure. The matters defined herein, such as a detailed construction and elements thereof, are provided to assist in a comprehensive understanding of the present disclosure. Thus, it is apparent that example embodiments may be carried out without those defined matters. Also, well-known functions or constructions are omitted to provide a clear and concise description of example embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the present disclosure, a first component may be referred to as a second component, and similarly, a second component may also be referred to as a first component.

The terms used in embodiments of the present disclosure may be construed as commonly known to those skilled in the art unless otherwise defined.

Further, the terms 'leading end', 'rear end', 'upper side', 'lower side', 'top end', 'bottom end', etc. used in the present disclosure are defined with reference to the drawings. However, the shape and position of each component are not limited by the terms.

Hereinafter, non-limiting example embodiments of a vehicle for uneven terrain according to the disclosure will be described with reference to the accompanying drawings.

Figure 1:
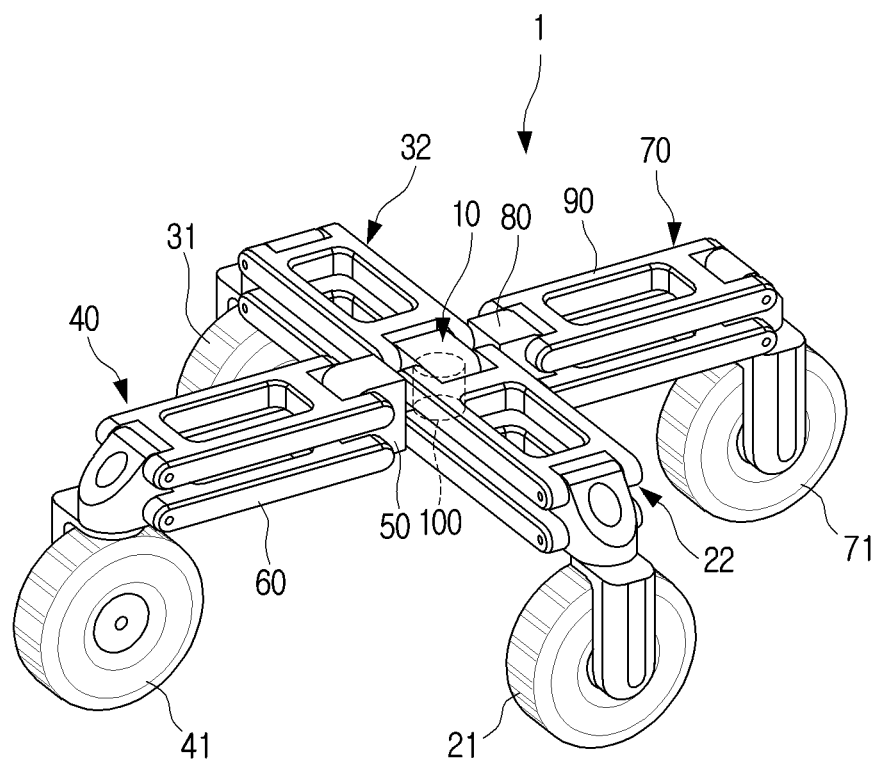
FIG. 1 is a perspective view illustrating a vehicle for uneven terrain according to an embodiment.
Figure 2:
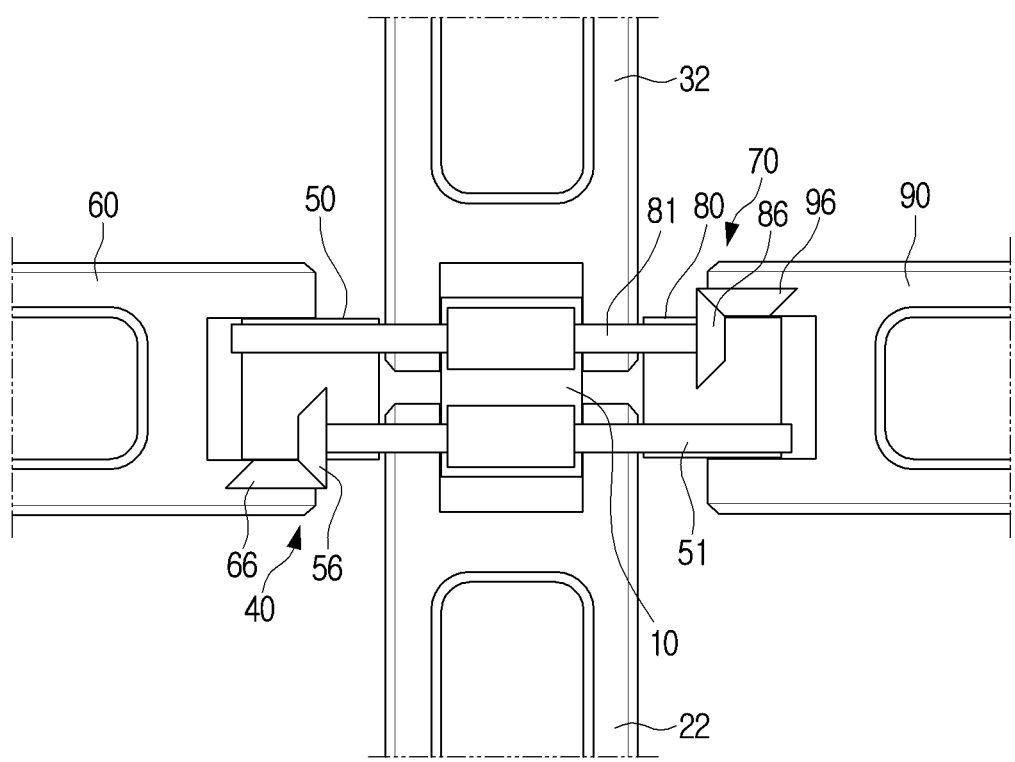
FIG. 2 is a partial plan view of the vehicle for uneven terrain of FIG. 1.

FIG. 1 is a perspective view illustrating a vehicle for uneven terrain according to an embodiment, and FIG. 2 is a partial plan view of the vehicle for uneven terrain of FIG. 1.

Referring to FIGS. 1 and 2, a vehicle 1 for uneven terrain according to an embodiment may include a main frame 10, a first side wheel assembly 22, a second side wheel assembly 32, a front wheel moving part 50, a front wheel assembly 60, a rear wheel moving part 80, and a rear wheel assembly 90.

The first side wheel assembly 22 may be disposed on one side of the main frame 10. A first side wheel 21 may be disposed on one end of the first side wheel assembly 22. The first side wheel 21 may be rotatably disposed under the first side wheel assembly 22.

The second side wheel assembly 32 may be disposed to face the first side wheel assembly 22 on the other side of the main frame 10. A second side wheel 31 may be disposed at one end of the second side wheel assembly 32. The second side wheel 31 may be rotatably disposed under the second side wheel assembly 32.

Each of the first side wheel 21 and the second side wheel 31 may be configured as a motorized wheel in which a driving motor is built-in.

The front wheel moving part 50 is disposed on the main frame 10 and may be formed to linearly move the front wheel assembly 60.

The front wheel assembly 60 is disposed in front of the main frame 10, and may be provided to linearly move back and forth with respect to the main frame 10. In addition, the front wheel assembly 60 may be provided to pivot at a predetermined angle with respect to the main frame 10.

A front wheel 41 may be rotatably disposed at the front end of the front wheel assembly 60. The front wheel 41 may be configured as a motorized wheel in which a driving motor is built-in.

The front wheel assembly 60 may be pivotably disposed at the front end of the front wheel moving part 50 provided to move linearly with respect to the main frame 10. The front wheel 41 may be rotatably disposed under the front wheel assembly 60.

The front wheel moving part 50 and the front wheel assembly 60 may be connected by a pair of bevel gears (e.g., a first front wheel bevel gear 56 and a second front wheel bevel gear 66).

The front wheel moving part 50 may include a spline shaft 51. A first front wheel bevel gear 56 may be provided at the leading end of the spline shaft 51. The first side wheel assembly 22 may be pivotably connected to the spline shaft 51 of the front wheel moving part 50.

The front wheel assembly 60 may be provided with a second front wheel bevel gear 66 meshed with the first front wheel bevel gear 56. The spline shaft 51, the first front wheel bevel gear 56, and the second front wheel bevel gear 66 may form a front wheel torque transmitting device 40 (e.g., a front wheel torque transmitter). Accordingly, the vertical movement of the front wheel 41 and the vertical movement of the first side wheel 21 may be interlocked with each other by the front wheel torque transmitting device 40.

The rear wheel moving part 80 is disposed at the main frame 10, and may be formed to linearly move the rear wheel assembly 90. The front wheel moving part 50 and the rear wheel moving part 80 may form a wheelbase adjuster capable of adjusting the wheelbase between the front wheel 41 and a rear wheel 71.

The rear wheel assembly 90 is disposed at the rear end of the main frame 10, and may be provided to linearly move back and forth with respect to the main frame 10. In addition, the rear wheel assembly 90 may be provided to pivot at a predetermined angle with respect to the main frame 10.

The rear wheel 71 may be rotatably disposed at the rear end of the rear wheel assembly 90. The rear wheel 71 may be configured as a motorized wheel having a built-in driving motor.

The rear wheel assembly 90 may be pivotably disposed at the rear end of the rear wheel moving part 80 provided to move linearly with respect to the main frame 10. The rear wheel 71 may be rotatably disposed under the rear wheel assembly 90.

The rear wheel moving part 80 and the rear wheel assembly 90 may be connected by a pair of bevel gears (e.g., a first rear wheel bevel gear 86 and a second rear wheel bevel gear 96).

The rear wheel moving part 80 may include a spline shaft 81. A first rear wheel bevel gear 86 may be provided at the leading end of the spline shaft 81. The second side wheel assembly 32 may be pivotably connected to the spline shaft 81 of the rear wheel moving part 80.

The rear wheel assembly 90 may be provided with a second rear wheel bevel gear 96 meshed with the first rear wheel bevel gear 86. The spline shaft 81, the first rear wheel bevel gear 86, and the second rear wheel bevel gear 96 may form a rear wheel torque transmitting device 70 (e.g., a rear wheel torque transmitter). Accordingly, the vertical movement of the rear wheel 71 and the vertical movement of the second side wheel 31 may be interlocked with each other by the rear wheel torque transmitting device 70.

A locking device 100 is disposed at the main frame 10, and may be provided to selectively lock the front wheel moving part 50 and the rear wheel moving part 80 with respect to the main frame 10. When the locking device 100 operates to lock the front wheel moving part 50 and the rear wheel moving part 80, the front wheel assembly 60 and the rear wheel assembly 90 may not move linearly back and forth with respect to the main frame 10. Accordingly, the wheelbase between the front wheel 41 and the rear wheel 71 does not change.

When the locking device 100 is released, the front wheel moving part 50 and the rear wheel moving part 80 may linearly move back and forth with respect to the main frame 10. Accordingly, the wheelbase between the front wheel 41 and the rear wheel 71 changes according to the moving direction of each of the front wheel 41 and the rear wheel 71.

In detail, when the front wheel 41 rotates in one direction and moves forward, and the rear wheel 71 rotates in the opposite direction to the front wheel 41 and moves backward, the wheelbase between the front wheel 41 and the rear wheel 71 increases. Conversely, when the front wheel 41 rotates in the opposite direction and moves backward, and the rear wheel 71 rotates in the opposite direction to the front wheel 41 and moves forward, the wheelbase is reduced.

The vehicle 1 for uneven terrain according to an embodiment having the above-described structure may climb various obstacles because the wheelbase between the front wheel 41 and the rear wheel 71 may be adjusted according to the size of the obstacle. For example, when the obstacle is the stairs, the vehicle 1 for uneven terrain according to an embodiment may adjust the wheelbase between the front wheel 41 and the rear wheel 71 according to the edge interval of the stairs, thereby easily climbing stairs of various sizes.

Hereinafter, a vehicle 1 for uneven terrain according to an embodiment will be described in detail with reference to FIGS. 3 to 9.

Figure 3:
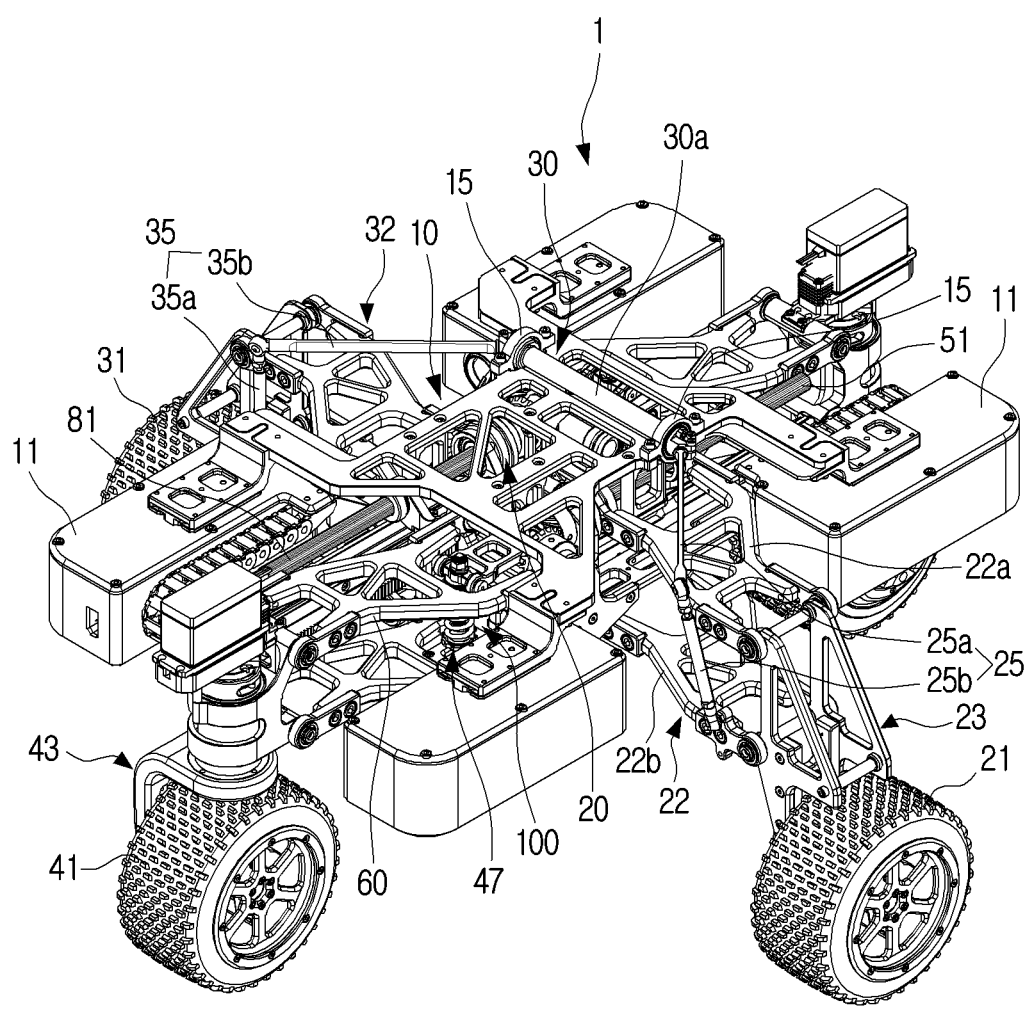
FIG. 3 is a perspective view illustrating a vehicle for uneven terrain according to an embodiment.
Figure 4:
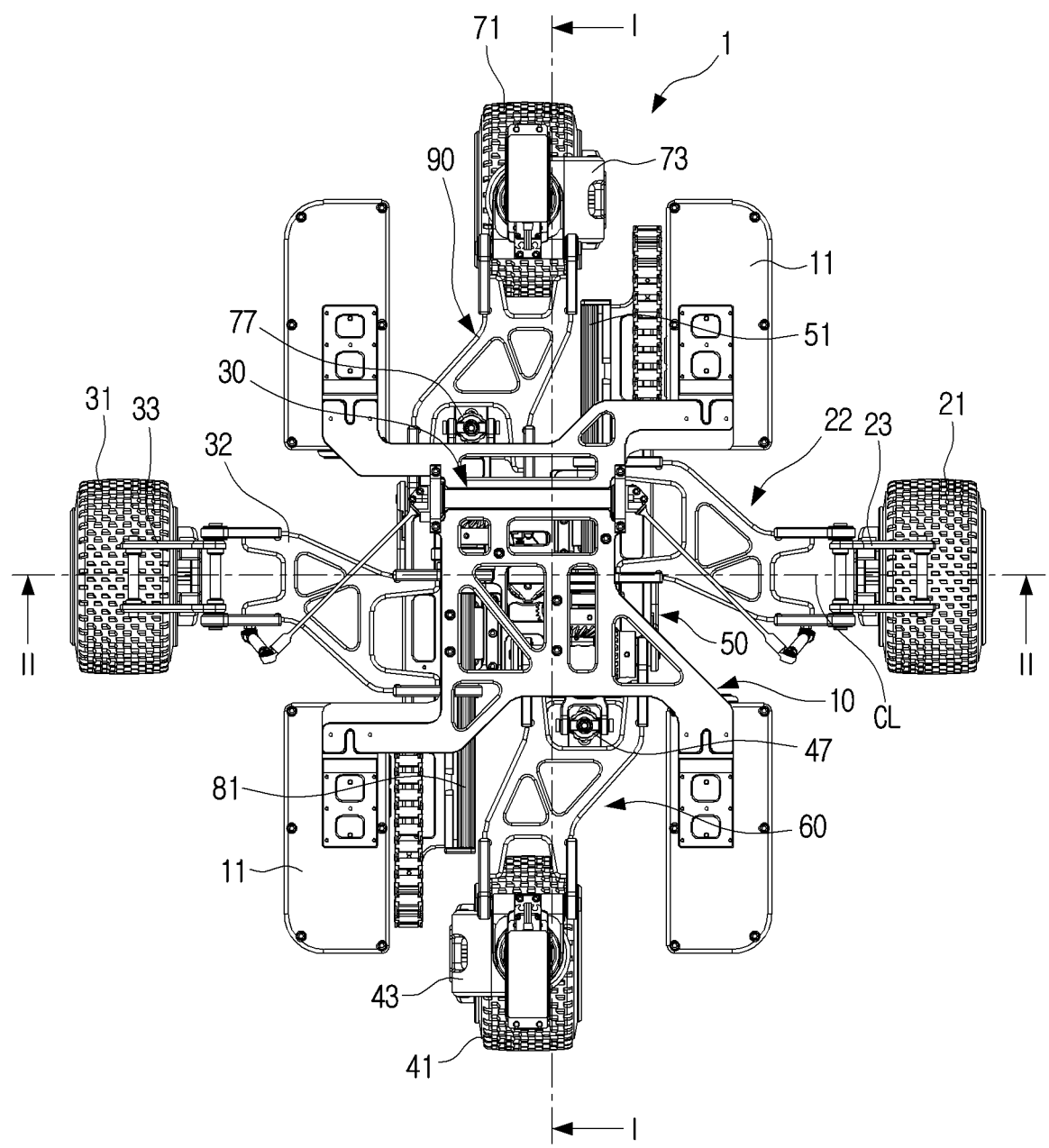
FIG. 4 is a partial plan view of the vehicle for uneven terrain of FIG. 3.
Figure 5:
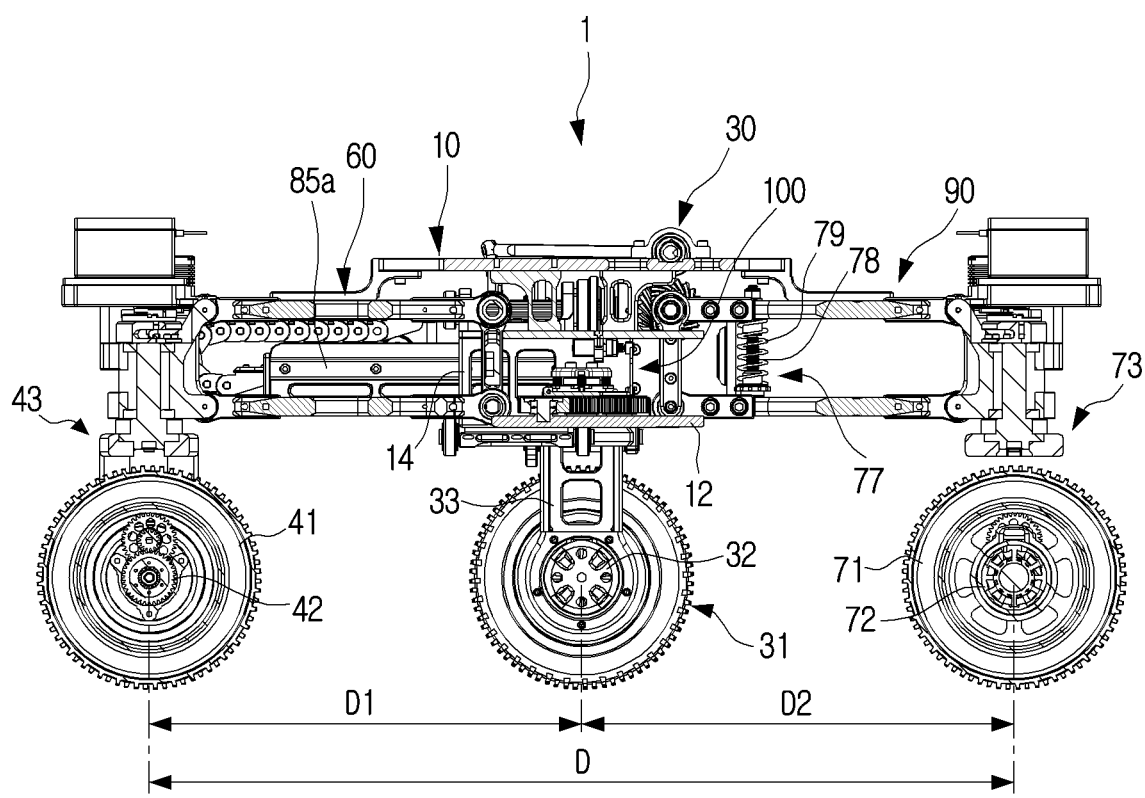
FIG. 5 is a cross-sectional view illustrating the vehicle for uneven terrain of FIG. 3 taken along line I-I.
Figure 6:
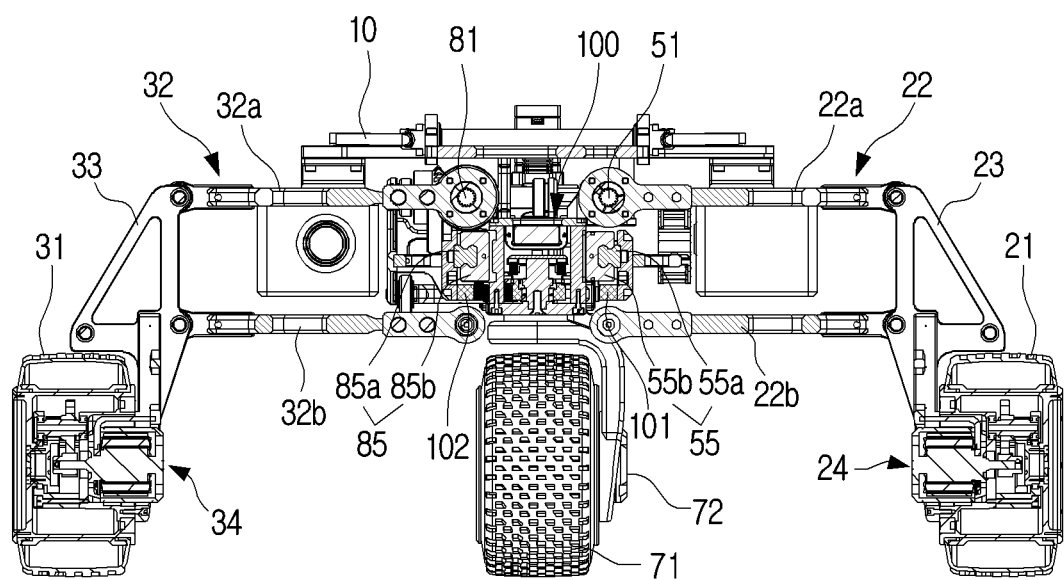
FIG. 6 is a cross-sectional view illustrating the vehicle for uneven terrain of FIG. 3 taken along line II-II.
Figure 7:
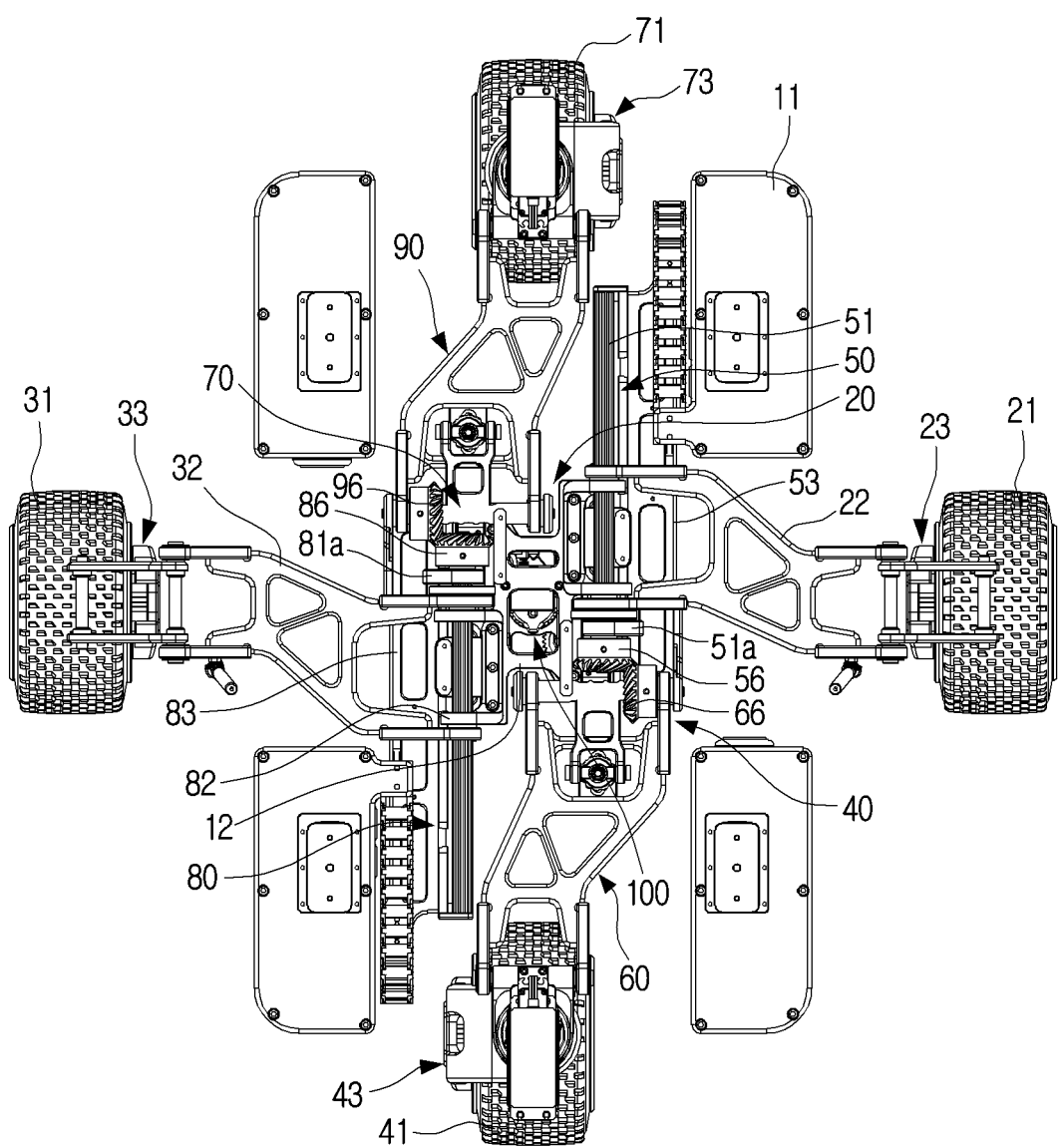
FIG. 7 is a plan view illustrating a state in which a main frame is removed from the vehicle for uneven terrain of FIG. 3.
Figure 8:
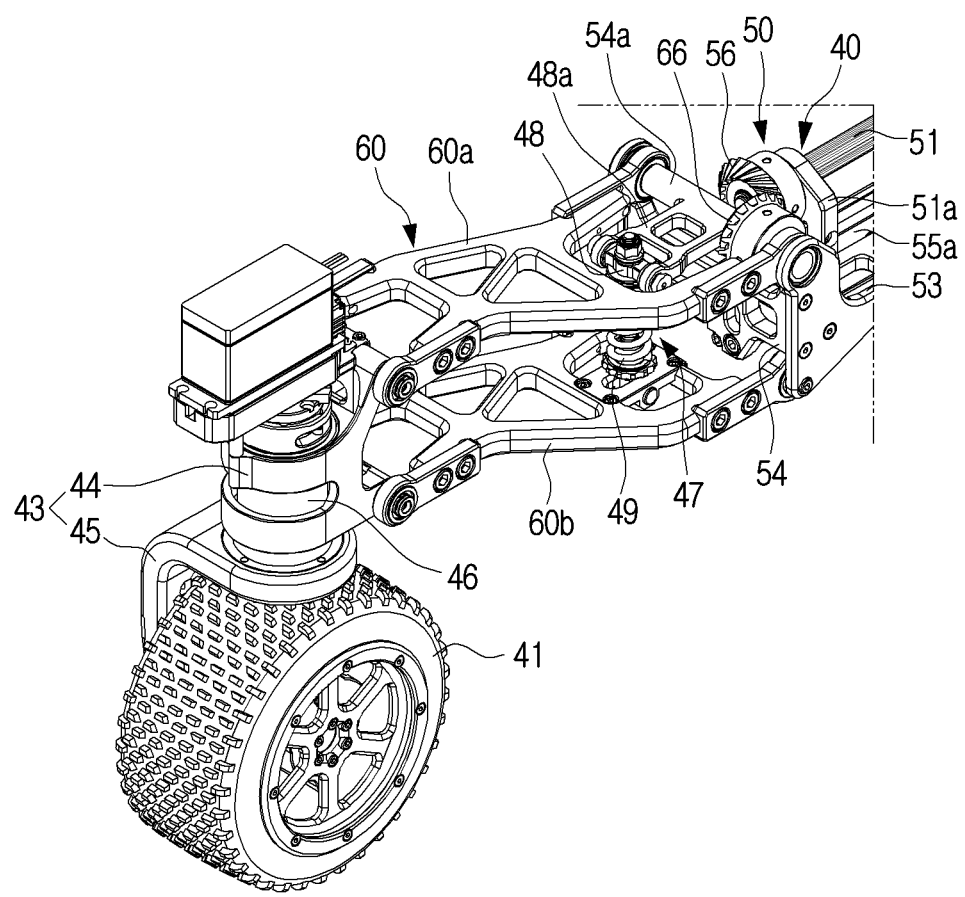
FIG. 8 is a partial perspective view illustrating a front wheel frame of a vehicle for uneven terrain according to an embodiment.
Figure 9:
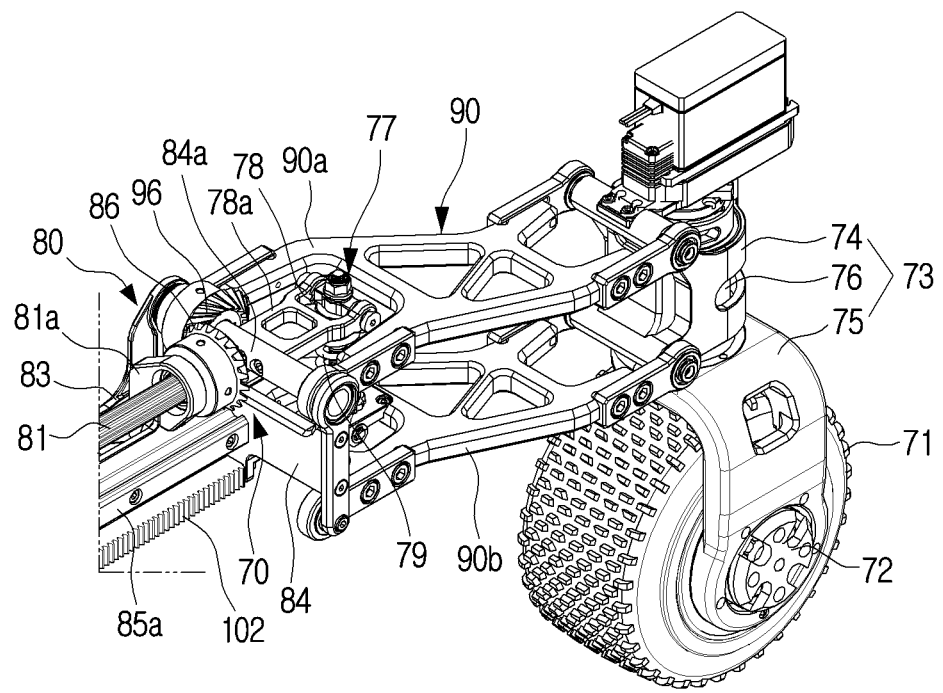
FIG. 9 is a partial perspective view illustrating a rear wheel frame of a vehicle for uneven terrain according to an embodiment.

FIG. 3 is a perspective view illustrating a vehicle for uneven terrain according to an embodiment, and FIG. 4 is a plan view of the vehicle for uneven terrain of FIG. 3. FIG. 5 is a cross-sectional view illustrating the vehicle for uneven terrain of FIG. 3 taken along line I-I. FIG. 6 is a cross-sectional view illustrating the vehicle for uneven terrain of FIG. 3 taken along line II-II. FIG. 7 is a plan view illustrating a state in which a main frame is removed from the vehicle for uneven terrain of FIG. 3. FIG. 8 is a partial perspective view illustrating a front wheel frame of a vehicle for uneven terrain according to an embodiment. FIG. 9 is a partial perspective view illustrating a rear wheel frame of a vehicle for uneven terrain according to an embodiment.

Referring to FIGS. 3 to 7, a vehicle 1 for uneven terrain according to an embodiment may include a main frame 10, a first side wheel assembly 22, a second side wheel assembly 32, a front wheel assembly 60, a rear wheel assembly 90, a wheelbase adjuster 20, a front wheel torque transmitting device 40, and a rear wheel torque transmitting device 70.

The main frame 10 may be formed to support the wheelbase adjuster 20, the first side wheel assembly 22, and the second side wheel assembly 32. A plurality of storage containers 11 may be provided in the main frame 10. A power source such as a battery, a processor configured to control the vehicle 1 for uneven terrain, and the like may be disposed inside the storage containers 11.

A lower frame 12 may be provided under the main frame 10. The lower frame 12 may be spaced apart from the main frame 10 by a predetermined distance. A locking device 100 may be disposed in the lower frame 12.

The first side wheel assembly 22 may be provided to rotatably support the first side wheel 21. The first side wheel assembly 22 may be disposed on one side, for example, the right side of the main frame 10. The first side wheel assembly 22 may be provided to pivot at a predetermined angle with respect to the main frame 10.

A first side wheel support frame 23 may be disposed at one end of the first side wheel assembly 22. The first side wheel 21 may be rotatably disposed under the first side wheel support frame 23.

The first side wheel assembly 22 may be formed as a double frame. In other words, the first side wheel assembly 22 may include a first upper frame 22a and a first lower frame 22b spaced downward from the first upper frame 22a by a predetermined distance.

One end of the first upper frame 22a may be pivotably connected to the front wheel moving part 50 of the wheelbase adjuster 20 to be described later. The other end of the first upper frame 22a may be pivotably connected to the first side wheel support frame 23.

One end of the first lower frame 22b may be pivotably connected to the lower frame 12. The other end of the first lower frame 22b may be pivotably connected to the first side wheel support frame 23. Accordingly, the first upper frame 22a, the first lower frame 22b, the first side wheel support frame 23, and the lower frame 12 may form a four-bar linkage.

The second side wheel assembly 32 may be provided to rotatably support the second side wheel 31. The second side wheel assembly 32 may be disposed on the other side of the main frame 10 opposite to the first side wheel assembly 22, for example, on the left side of the main frame 10, and may be provided to pivot at a predetermined angle with respect to the main frame 10.

A second side wheel support frame 33 may be disposed at one end of the second side wheel assembly 32. The second side wheel 31 may be rotatably disposed under the second side wheel support frame 33. The rotation shaft of the second side wheel 31 may be disposed to be positioned in a straight line with the rotation shaft of the first side wheel 21 of the first side wheel assembly 22.

The second side wheel assembly 32 may be formed as a double frame. In other words, the second side wheel assembly 32 may include a second upper frame 32a and a second lower frame 32b spaced downward from the second upper frame 32a by a predetermined distance.

One end of the second upper frame 32a may be pivotably connected to the rear wheel moving part 80 of the wheelbase adjuster 20 to be described later. The other end of the second upper frame 32a may be pivotably connected to the second side wheel support frame 33.

One end of the second lower frame 32b may be pivotably connected to the lower frame 12. The other end of the second lower frame 32b may be pivotably connected to the second side wheel support frame 33. Accordingly, the second upper frame 32a, the second lower frame 32b, the second side wheel support frame 33, and the lower frame 12 may form a four-bar linkage.

The first side wheel assembly 22 and the second side wheel assembly 32 may be supported with a stabilizer 30 relative to the main frame 10. Accordingly, the suspension of the first side wheel 21 and the suspension of the second side wheel 31 may be interlocked by the stabilizer 30.

The stabilizer 30 may include a first two-bar linkage 25 supporting the first side wheel assembly 22, a second two-bar linkage 35 supporting the second side wheel assembly 32, and a stabilizer bar 30a connecting the first two-bar linkage 25 and the second two-bar linkage 35.

The stabilizer bar 30a may be rotatably disposed on the main frame 10. For example, both ends of the stabilizer bar 30a may be disposed to be supported by bearings 15 provided at the main frame 10.

One end of the stabilizer bar 30a may be connected to the first two-bar linkage 25.

The first two-bar linkage 25 may include a first horizontal linkage 25a and a first vertical linkage 25b. One end of the first vertical linkage 25b may be connected to the first lower frame 22b, and the other end of the first vertical linkage 25b may be connected to one end of the first horizontal linkage 25a. The other end of the first horizontal linkage 25a may be connected to one end of the stabilizer bar 30a.

The other end of the stabilizer bar 30a may be connected to the second two-bar linkage 35.

The second two-bar linkage 35 may include a second vertical linkage 35a and a second horizontal linkage 35b. One end of the second vertical linkage 35a may be connected to the second lower frame 32b, and the other end of the second vertical linkage 25a may be connected to one end of the second horizontal linkage 35b. The other end of the second horizontal linkage 35b may be connected to the other end of the stabilizer bar 30a.

Accordingly, the movement of each of the first two-bar linkage 25 and the second two-bar linkage 35 may be transmitted to the opposite side through the stabilizer bar 30a. In other words, because the movement of the first side wheel assembly 22 in which the first side wheel 21 is disposed is transmitted to the second two-bar linkage 35 through the first two-bar linkage 25 and the stabilizer bar 30a, the second side wheel assembly 32 in which the second side wheel 31 is disposed may be moved interlocking with the first side wheel assembly 22.

For example, when the first side wheel 21 of the first side wheel assembly 22 moves down, the second side wheel 31 of the second side wheel assembly 32 also moves down by the stabilizer 30.

Conversely, because the movement of the second side wheel assembly 32 in which the second side wheel 31 is disposed may be transmitted to the first two-bar linkage 25 through the second two-bar linkage 35 and the stabilizer bar 30a, the first side wheel assembly 22 may be moved interlocking with the second side wheel assembly 32.

For example, when the second side wheel 31 of the second side wheel assembly 32 moves down, the first side wheel 21 of the first side wheel assembly 22 also moves down by the stabilizer 30. Accordingly, the first side wheel 21 and the second side wheel 31 may be positioned at approximately the same height by the stabilizer 30.

The first side wheel 21 and the second side wheel 31 may be configured as motorized wheels in which a first side wheel driving motor 24 and a second side wheel driving motor 34 are built-in, respectively. The first side driving motor 24 is fixed to the first side wheel support frame 23, and the second side driving motor 34 is fixed to the second side wheel support frame 33. Accordingly, the first side wheel 21 and the second side wheel 31 may rotate with respect to the first side wheel support frame 23 and the second side wheel support frame 33, respectively.

As another example, each of the first side wheel 21 and the second side wheel 31 may be configured to receive power from an externally disposed driving motor through a power transmission device such as pulleys and a belt, or the like.

The front wheel assembly 60 is disposed in front of the main frame 10, and may be provided to be linearly moved back and forth with respect to the main frame 10. Also, the front wheel assembly 60 may be provided to pivot at a predetermined angle with respect to the main frame 10.

The front wheel 41 may be rotatably disposed at the front end of the front wheel assembly 60. The front wheel 41 may be configured as a motorized wheel in which a driving motor 42 is built-in.

The front wheel assembly 60 may be pivotably disposed at the front end of the front wheel moving part 50 provided to move linearly with respect to the main frame 10.

Referring to FIG. 8, the front wheel assembly 60 is disposed in front of the front wheel moving part 50, and is provided to pivot at a predetermined angle with respect to the front wheel moving part 50. A front wheel support frame 43 supporting rotation of the front wheel 41 may be disposed at the front end of the front wheel assembly 60.

The front wheel assembly 60 may be formed as a double frame. In other words, the front wheel assembly 60 may include an upper front frame 60*a* and a lower front frame 60*b* spaced downward by a predetermined distance from the upper front frame 60*a*.

The rear end of the upper front frame 60*a* may be pivotably connected to a front plate 54 of the front wheel moving part 50. A fixed shaft 54*a* may be provided at the upper end of the front plate 54 of the front wheel moving part 50. The rear end of the upper front frame 60*a* may be rotatably connected to the fixed shaft 54*a* of the front plate 54. The front end of the upper front frame 60*a* may be pivotably connected to the front wheel support frame 43.

The rear end of the lower front frame 60*b* may be pivotably connected to the lower end of the front plate 54. Accordingly, the front wheel assembly 60 may pivot at a predetermined angle with respect to the front plate 54 of the front wheel moving part 50. The front end of the lower front frame 60*b* may be pivotably connected to the front wheel support frame 43.

Accordingly, the upper front frame 60*a* and the lower front frame 60*b* of the front wheel assembly 60, the front plate 54 of the front wheel moving part 50, and the front wheel support frame 43 may form a four-bar linkage.

The front wheel support frame 43 may be formed to rotatably support the front wheel 41. In addition, the front wheel support frame 43 may include a front wheel steering motor 46 for control the moving direction of the front wheel 41.

For example, the front wheel support frame 43 may include a motor fixing part 44 formed to fix the front wheel steering motor 46, and a front wheel support part 45 that is rotated by the front wheel steering motor 46 and supports the driving motor 42 of the front wheel 41. Accordingly, when the front wheel steering motor 46 operates, the front wheel support part 45 rotates to change a moving direction of the front wheel 41. When the driving motor 42 of the front wheel 41 operates, the front wheel 41 rotates so that the front wheel assembly 60 moves.

The rear wheel assembly 90 is disposed at the rear of the main frame 10, and may be provided to move linearly back and forth with respect to the main frame 10. In addition, the rear wheel assembly 90 may be provided to pivot at a predetermined angle with respect to the main frame 10.

The rear wheel 71 may be rotatably disposed at the rear end of the rear wheel assembly 90. The rear wheel 71 may be configured as a motorized wheel in which a driving motor 72 is built-in.

The rear wheel assembly 90 may be pivotably disposed at the front end of the rear wheel moving part 80 provided to move linearly with respect to the main frame 10. The rear wheel 71 may be rotatably disposed at the rear end of the rear wheel assembly 90.

Referring to FIG. 9, the rear wheel assembly 90 is disposed at the rear of the rear wheel moving part 80, and may be provided to pivot at a predetermined angle with respect to the rear wheel moving part 80. A rear wheel support frame 73 formed to rotatably support the rear wheel 71 may be disposed at the rear end of the rear wheel assembly 90.

The rear wheel assembly 90 may be formed as a double frame. In other words, the rear wheel assembly 90 may include an upper rear frame 90*a* and a lower rear frame 90*b* spaced downward by a predetermined distance from the upper rear frame 90*a*.

The front end of the upper rear frame 90*a* may be pivotably connected to a rear plate 84 of the rear wheel moving part 80. A fixed shaft 84*a* may be provided at the upper end of the rear plate 84 of the rear wheel moving part 80. The front end of the upper rear frame 90*a* may be rotatably connected to the fixed shaft 84*a* of the rear plate 84. The rear end of the upper rear frame 90*a* may be pivotably connected to the rear wheel support frame 73.

The front end of the lower rear frame 90*b* may be pivotably connected to the lower end of the rear plate 84. Accordingly, the rear wheel assembly 90 may pivot at a predetermined angle with respect to the rear plate 84 of the rear wheel moving part 80. The rear end of the lower rear frame 90*b* may be pivotably connected to the rear wheel support frame 73.

Accordingly, the upper rear frame 90*a* and the lower rear frame 90*b* of the rear wheel assembly 90, the rear plate 84 of the rear wheel moving part 80, and the rear wheel support frame 73 may form a four-bar linkage.

The rear wheel support frame 73 may be formed to rotatably support the rear wheel 71. In addition, the rear wheel support frame 73 may include a rear wheel steering motor 76 for changing the moving direction of the rear wheel 71.

For example, the rear wheel support frame 73 may include a motor fixing part 74 formed to fix the rear wheel steering motor 76, and a rear wheel support part 75 that is rotated by the rear wheel steering motor 76 and supports the driving motor 72 of the rear wheel 71. Accordingly, when the rear wheel steering motor 76 operates, the rear wheel support part 75 rotates to change the moving direction of the rear wheel 71. When the driving motor 72 of the rear wheel 71 operates, the rear wheel 71 rotates so that the rear wheel assembly 90 moves.

The wheelbase adjuster 20 may be formed to adjust the wheelbase between the front wheel 41 and the rear wheel 71.

The wheelbase adjuster 20 may be disposed in the main frame 10 between the front wheel assembly 60 and the rear wheel assembly 90.

The wheelbase adjuster 20 may include the front wheel moving part 50 configured to linearly move the front wheel assembly 60 and the rear wheel moving part 80 configured to linearly move the rear wheel assembly 90. The front wheel moving part 50 and the rear wheel moving part 80 may be disposed to face each other and to be parallel to each other.

The front wheel moving part 50 may be formed to linearly move back and forth with respect to the main frame 10. Because the front wheel assembly 60 is provided in front of the front wheel moving part 50, when the front wheel assembly 60 is moved back and forth by the front wheel 41, the front wheel moving part 50 is also moved back and forth integrally with the front wheel assembly 60.

The front wheel moving part 50 may include a front wheel moving base 53 and the front plate 54 disposed perpendicular to the front wheel moving base 53.

The front wheel moving part 50 may include a linear motion member capable of guiding the linear movement of the front wheel assembly 60. For example, a linear motion guide (LM guide) 55 may be used as the linear motion member.

A rail 55a of the LM guide 55 may be disposed on the front wheel moving base 53. The rail 55a may be disposed on the front wheel moving base 53 perpendicular to a side wheel center line CL connecting the rotation center of the first side wheel 21 and the rotation center of the second side wheel 31.

A block 55b of the LM guide 55 that is slidably coupled to the rail 55a may be fixed to the main frame 10. Accordingly, the linear motion of the front wheel moving part 50 may be guided by the LM guide 55.

The rear wheel moving part 80 may be formed to linearly move back and forth with respect to the main frame 10. The rear wheel moving part 80 may be provided in the main frame 10 in parallel with the front wheel moving part 50 on one side of the front wheel moving part 50. The rear wheel moving part 80 may have the same structure as the front wheel moving part 50.

Because the rear wheel assembly 90 is provided at the rear end of the rear wheel moving part 80, when the rear wheel assembly 90 moves back and forth, the rear wheel moving part 80 also moves back and forth integrally with the rear wheel assembly 90.

The rear wheel moving part 80 may include a rear wheel moving base 83 and the rear plate 84 disposed perpendicular to the rear wheel moving base 83.

The rear wheel moving part 80 may include a linear motion member capable of guiding the linear movement of the rear wheel assembly 90. For example, a linear motion guide (LM guide) 85 may be used as the linear motion member.

A rail 85a of the LM guide 85 may be disposed on the rear wheel moving base 83. The rail 85a may be disposed on the rear wheel moving base 83 perpendicular to the side wheel center line CL connecting the rotation center of the first side wheel 21 and the rotation center of the second side wheel 31.

A block 85b of the LM guide 85 that is slidably coupled to the rail 85a may be fixed to the main frame 10. The block 85b of the LM guide 85 of the rear wheel moving part 80 may be disposed on the main frame 10 to face the block 55b of the LM guide 55 of the front wheel moving part 50. Accordingly, the linear motion of the rear wheel moving part 80 may be guided by the LM guide 85.

In other words, the LM guide 55 of the front wheel moving part 50 and the LM guide 85 of the rear wheel moving part 80 are disposed in the main frame 10 parallel to each other. The front wheel assembly 60 may be linearly moved by the LM guide 55 of the front wheel moving part 50, and the rear wheel assembly 90 may be linearly moved by the LM guide 85 of the rear wheel moving part 80.

The wheelbase adjuster 20 may include a synchronizing device that allows the front wheel moving part 50 and the rear wheel moving part 80 to move the same distance in opposite directions. The synchronizing device may include a pair of racks (e.g., a front wheel rack 101 and a rear wheel rack 102) and at least one pinion (e.g., first, second, and third pinions 111, 112, and 113).

The pair of racks may include a front wheel rack 101 disposed on the front wheel moving part 50 and a rear wheel rack 102 disposed on the rear wheel moving part 80.

The front wheel rack 101 may be disposed on the front wheel moving base 53 in parallel with the LM guide 55 under the LM guide 55 of the front wheel moving part 50. In detail, the front wheel rack 101 may be disposed under the rail 55a of the LM guide 55. Accordingly, the front wheel rack 101 may move integrally with the front wheel moving part 50. In other words, when the front wheel moving part 50 linearly moves back and forth with respect to the main frame 10, the front wheel rack 101 also linearly moves back and forth with respect to the main frame 10.

The rear wheel rack 102 may be disposed on the rear wheel moving base 83 in parallel with the LM guide 85 under the LM guide 85 of the rear wheel moving part 80. In detail, the rear wheel rack 102 may be disposed under the rail 85a of the LM guide 85. Accordingly, the rear wheel rack 102 faces the front wheel rack 101 in parallel, and is spaced apart from the front wheel rack 101 by a predetermined distance.

The rear wheel rack 102 may move integrally with the rear wheel moving part 80. In other words, when the rear wheel moving part 80 linearly moves back and forth with respect to the main frame 10, the rear wheel rack 102 also linearly moves back and forth with respect to the main frame 10.

The at least one pinion may be disposed between the front wheel rack 101 and the rear wheel rack 102. The at least one pinion may be disposed to engage both the front wheel rack 101 and the rear wheel rack 102. Accordingly, the front wheel rack 101 and the rear wheel rack 102 may be interlocked through the at least one pinion.

In the case of this embodiment, three pinions, that is, a first pinion 111, a second pinion 112, and a third pinion 113 are provided between the front wheel rack 101 and the rear wheel rack 102. The first, second, and third pinions 111, 112, and 113 form a gear train.

The first pinion 111 meshes with the front wheel rack 101, and the second pinion 112 meshes with the rear wheel rack 102. The third pinion 113 is disposed between the first pinion 111 and the second pinion 112, and meshes with the first pinion 111 and the second pinion 112. The first, second, and third pinions 111, 112, and 113 may be formed in the same standard. Therefore, when the front wheel rack 101 moves a certain distance in one direction, the rear wheel rack 102 also moves the same distance in the opposite direction through the first, second, and third pinions 111, 112, and 113.

In this embodiment, the wheelbase adjuster 20 does not include a separate driving source. The wheelbase adjuster 20 is configured so that when the front wheel 41 and the rear wheel 71 rotate, the front wheel moving part 50 and the rear wheel moving part 80 move linearly.

However, as another example, the front wheel moving part 50 and the rear wheel moving part 80 of the wheelbase adjuster 20 may be configured to be linearly moved by a separate driving source. For example, when a driving source is connected to at least one pinion (e.g., the first, second, and third pinions 111, 112, and 113), the front wheel moving part 50 and the rear wheel moving part 80 may be simultaneously moved in opposite directions.

As another example, each of the front wheel moving part 50 and the rear wheel moving part 80 may be configured to be linearly moved by a separate driving source.

The front wheel torque transmitting device 40 may be formed to interlock the vertical movement of the front wheel 41 and the vertical movement of the first side wheel 21. The front wheel torque transmitting device 40 may be configured to transmit the vertical movement of the front wheel 41, i.e., the pivoting of the front wheel assembly 60, to the first side wheel assembly 22. The front wheel torque transmitting device 40 may be implemented mechanically or hydraulically.

For example, the front wheel torque transmitting device 40 may include a spline shaft 51 disposed in the front wheel moving part 50 and a pair of bevel gears (e.g., a first front wheel bevel gear 56 and a second front wheel bevel gear 66) connecting the front wheel moving part 50 and the front wheel assembly 60.

The spline shaft 51 may be supported by a pair of bosses 52 spaced apart by a predetermined distance. The pair of bosses 52 may be fixed to the lower frame 12. Because the lower frame 12 is fixed to the bottom surface of the main frame 10 through a plurality of fixing members 14, the pair of bosses 52 are fixed to the main frame 10. Accordingly, the spline shaft 51 may move linearly with respect to the main frame 10.

In addition, the first upper frame 22a of the first side wheel assembly 22 may be pivotably connected to the spline shaft 51. Accordingly, the spline shaft 51 may move linearly with respect to the first side wheel assembly 22.

One end of the spline shaft 51 may be fixed to the front wheel moving base 53. For example, one end of the spline shaft 51 may be fixed by a fixing bracket 51a, and the fixing bracket 51a may be fixed to the front wheel moving base 53. Therefore, when the front wheel moving base 53 moves, the spline shaft 51 may move integrally with the front wheel moving base 53.

The spline shaft 51 may be disposed on the front wheel moving base 53 parallel to the rail 55a of the LM guide 55 above the rail 55a. Accordingly, the linear motion of the front wheel moving part 50 may be guided by the spline shaft 51 and the LM guide 55.

The pair of bevel gears (e.g., a first front wheel bevel gear 56 and a second front wheel bevel gear 66) may connect the front wheel moving part 50 and the front wheel assembly 60. With this configuration, the front wheel moving part 50 may receive rotation by pivoting of the front wheel assembly 60 and transmit the rotation to the first side wheel assembly 22 while linearly moving back and forth with respect to the main frame 10.

To this end, a first front wheel bevel gear 56 may be disposed at the leading end of the spline shaft 51. For example, the first front wheel bevel gear 56 may be disposed at the leading end of the spline shaft 51 on one side of the fixing bracket 51a. The front wheel assembly 60 may be provided with a second front wheel bevel gear 66 meshed with the first front wheel bevel gear 56.

In detail, the second front wheel bevel gear 66 meshed with the first front wheel bevel gear 56 of the spline shaft 51 may be provided at the rear end of the front wheel assembly 60. The second front wheel bevel gear 66 may be disposed to rotate on the fixed shaft 54a provided on the front plate 54. In this case, the fixed shaft 54a of the front plate 54 and the spline shaft 51 form a right angle.

When the front wheel assembly 60 rotates upward at a predetermined angle about the fixed shaft 54a of the front plate 54, the second front wheel bevel gear 66 rotates on the fixed shaft 54a. When the second front wheel bevel gear 66 rotates, the first front wheel bevel gear 56 meshed with the second front wheel bevel gear 66 is rotated and applies a force to the spline shaft 51 in a downward direction. Then, because the first side wheel assembly 22 coupled to the spline shaft 51 receives a force in the downward direction, the first side wheel 21 disposed on the first side wheel assembly 22 is moved downward. In other words, the vertical movement of the first side wheel 21 and the vertical movement of the front wheel 41 may be interlocked with each other by the front wheel torque transmitting device 40.

Therefore, when the front wheel assembly 60, on which the front wheel 41 is disposed, turns upward to climb an obstacle such as the stairs, the first side wheel assembly 22 is moved downward by the front wheel torque transmitting device 40 so that the first side wheel 21 is in stable contact with the surface of the obstacle (e.g., the ground). Accordingly, the vehicle 1 for uneven terrain according to an embodiment may climb the obstacle stably.

The rear wheel torque transmitting device 70 may be configured to interlock the vertical movement of the rear wheel 71 and the vertical movement of the second side wheel 31. The rear wheel torque transmitting device 70 may be configured to transmit the vertical movement of the rear wheel 71, that is, the pivoting of the rear wheel assembly 90, to the second side wheel assembly 32. The rear wheel torque transmitting device 70 may be implemented mechanically or hydraulically. The rear wheel torque transmitting device 70 may have the same configuration as the front wheel torque transmitting device 40.

For example, the rear wheel torque transmitting device 70 may include a spline shaft 81 disposed in the rear wheel moving part 80 and a pair of bevel gears (e.g., a first rear wheel bevel gear 86 and a second rear wheel bevel gear 96) connecting the rear wheel moving part 80 and the rear wheel assembly 90.

The rear wheel moving part 80 may include the spline shaft 81. The spline shaft 81 may be supported by a pair of bosses 82 spaced apart by a predetermined distance. The pair of bosses 82 may be fixed to the lower frame 12. Because the lower frame 12 is fixed to the bottom surface of the main frame 10 through the plurality of fixing members 14, the pair of bosses 82 are fixed to the main frame 10. Accordingly, the spline shaft 81 may move linearly with respect to the main frame 10.

In addition, the second upper frame 32a of the second side wheel assembly 32 may be pivotably connected to the spline shaft 81. Accordingly, the spline shaft 81 may move linearly with respect to the second side wheel assembly 32.

One end of the spline shaft 81 may be fixed to the rear wheel moving base 83. For example, one end of the spline shaft 81 may be fixed by a fixing bracket 81a, and the fixing bracket 81a may be fixed to the rear wheel moving base 83. Therefore, when the rear wheel moving base 83 moves, the spline shaft 81 may move integrally with the rear wheel moving base 83.

The spline shaft 81 may be disposed on the rear wheel moving base 83 parallel to the rail 85a of the LM guide 85 above the rail 85a. Accordingly, the linear motion of the rear wheel moving part 80 may be guided by the spline shaft 81 and the LM guide 85.

The pair of bevel gears (e.g., the first rear wheel bevel gear 86 and the second rear wheel bevel gear 96) may connect the rear wheel moving part 80 and the rear wheel assembly 90. With this configuration, the rear wheel moving part 80 may receive rotation by pivoting of the rear wheel assembly 90, and transmit the rotation to the second side wheel assembly 32 while linearly moving back and forth with respect to the main frame 10.

To this end, a first rear wheel bevel gear 86 may be disposed at the leading end of the spline shaft 81. For example, the first rear wheel bevel gear 86 may be disposed at the leading end of the spline shaft 81 on one side of the fixing bracket 81a. The rear wheel assembly 90 may be provided with a second rear wheel bevel gear 96 meshed with the first rear wheel bevel gear 86.

In detail, the second rear wheel bevel gear 96 meshed with the first rear wheel bevel gear 86 of the spline shaft 81 may be provided at the front end of the rear wheel assembly 90. The second rear wheel bevel gear 96 may be disposed to rotate on a fixed shaft 84a provided on the rear plate 84. In this case, the fixed shaft 84a of the rear plate 84 and the spline shaft 81 form a right angle.

When the rear wheel assembly 90 rotates upward at a predetermined angle about the fixed shaft 84a of the rear plate 84, the second rear wheel bevel gear 96 rotates on the fixed shaft 84a. When the second rear wheel bevel gear 96 rotates, the first rear wheel bevel gear 86 meshed with the second rear wheel bevel gear 96 is rotated and applies a force to the spline shaft 81 in a downward direction. Then, because the second side wheel assembly 32 coupled to the spline shaft 81 receives a force in the downward direction, the second side wheel 31 disposed on the second side wheel assembly 32 is moved downward. In other words, the vertical movement of the second side wheel 31 and the vertical movement of the rear wheel 71 may be interlocked with each other by the rear wheel torque transmitting device 70.

Therefore, when the second side wheel assembly 32, on which the second side wheel 31 is disposed, turns upward to climb an obstacle such as the stairs, the rear wheel assembly 90 is moved downward by the rear wheel torque transmitting device 70 so that the rear wheel 71 is in stable contact with the surface of the obstacle (e.g., the ground). Accordingly, the vehicle 1 for uneven terrain according to an embodiment may climb the obstacle stably.

Each of the front wheel assembly 60 and the rear wheel assembly 90 may be provided with a shock absorber. In detail, a front shock absorber 47 may be provided in the front wheel assembly 60, and a rear shock absorber 77 may be provided in the rear wheel assembly 90.

The front shock absorber 47 may be disposed between the front wheel moving part 50 and the front wheel assembly 60.

Referring to FIG. 8, the front shock absorber 47 may include a damper 48 and a coil spring 49. The lower end of the damper 48 may be fixed to the lower surface of the front wheel assembly 60, that is, the lower front frame 60b, and the upper end of the damper 48 may be pivotably connected to a damper bracket 48a fixed to the fixed shaft 54a of the front wheel moving part 50. The coil spring 49 may be disposed outside of the damper 48. In other words, the damper 48 may be disposed to be inserted into the coil spring 49.

When the front shock absorber 47 is disposed between the front wheel assembly 60 and the front wheel moving part 50 as described above, a shock applied to the front wheel 41 may be absorbed, and the road surface followability of the front wheel 41 may be improved.

The rear shock absorber 77 may be disposed between the rear wheel moving part 80 and the rear wheel assembly 90. The rear shock absorber 77 may be formed the same as or similar to the front shock absorber 47.

Referring to FIG. 9, the rear shock absorber 77 may include a damper 78 and a coil spring 79. The lower end of the damper 78 may be fixed to the lower surface of the rear wheel assembly 90, that is, the lower rear frame 90b, and the upper end of the damper 78 may be pivotably connected to a damper bracket 78a fixed to the fixed shaft 84a of the rear wheel moving part 80. The coil spring 79 may be disposed outside of the damper 78. In other words, the damper 78 may be disposed to be inserted into the coil spring 79.

When the rear shock absorber 77 is disposed between the rear wheel assembly 90 and the rear wheel moving part 80 as described above, a shock applied to the rear wheel 71 may be absorbed, and the road surface followability of the rear wheel 71 may be improved.

The wheelbase adjuster 20 may include a locking device 100 configured to selectively fix the front wheel moving part 50 and the rear wheel moving part 80. The locking device 100 may be disposed on the main frame 10, and may be formed to selectively fix the front wheel moving part 50 and the rear wheel moving part 80 with respect to the main frame 10.

When the locking device 100 operates to fix the front wheel moving part 50 and the rear wheel moving part 80, the front wheel assembly 60 and the rear wheel assembly 90 may not move with respect to the main frame 10. Accordingly, the wheelbase D between the front wheel 41 and the rear wheel 71 does not change.

When the locking device 100 is released, the front wheel assembly 60 and the rear wheel assembly 90 may linearly move back and forth with respect to the main frame 10. Accordingly, the wheelbase D between the front wheel 41 and the rear wheel 71 may be changed.

Hereinafter, an example of the locking device 100 used in the vehicle 1 for uneven terrain according to an embodiment will be described in detail with reference to FIGS. 10 to 12B.

Figure 10:
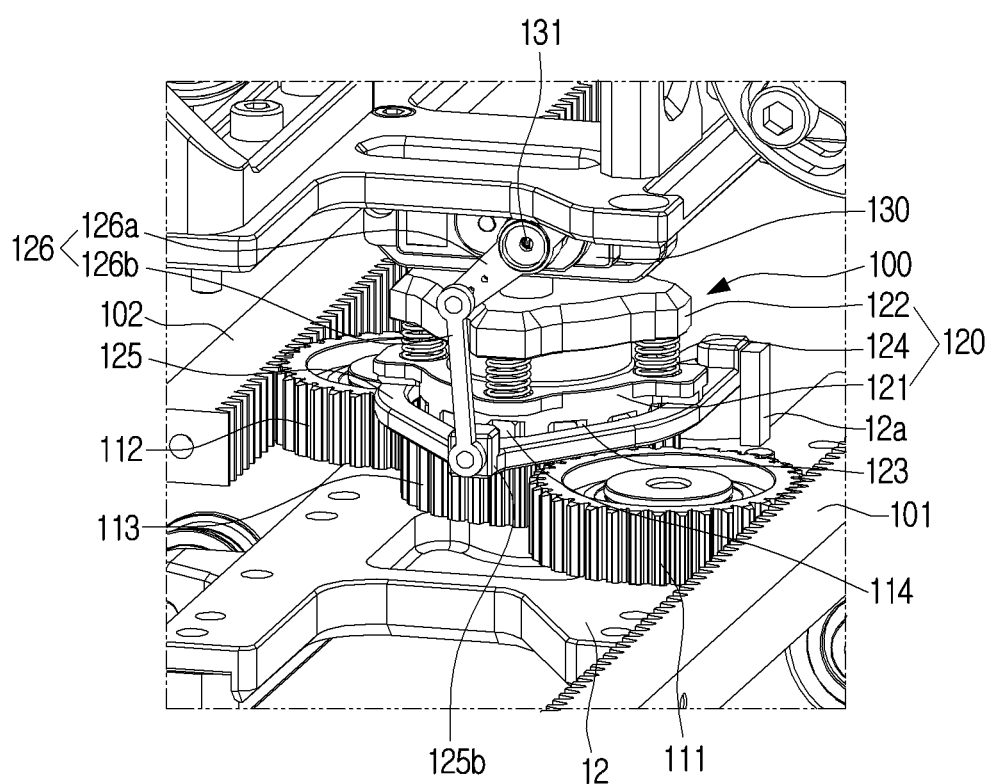
FIG. 10 is a perspective view illustrating a locking device of a vehicle for uneven terrain according to an embodiment.
Figure 11:
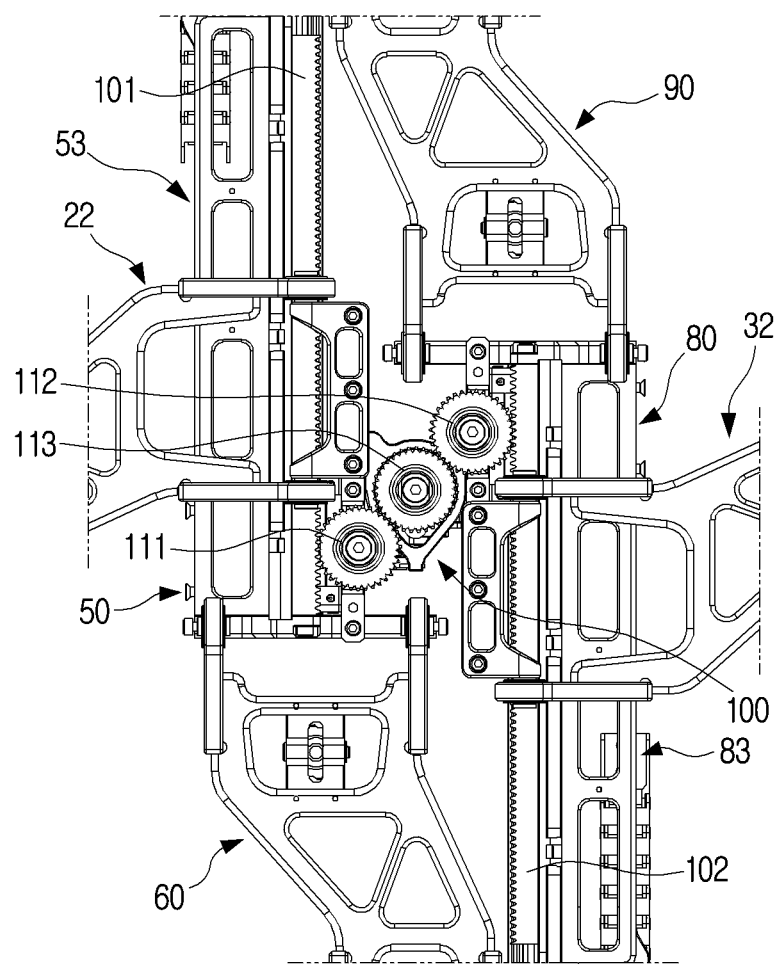
FIG. 11 is a partial view illustrating racks and pinions of a locking device of a vehicle for uneven terrain according to an embodiment.
Figure 12A:
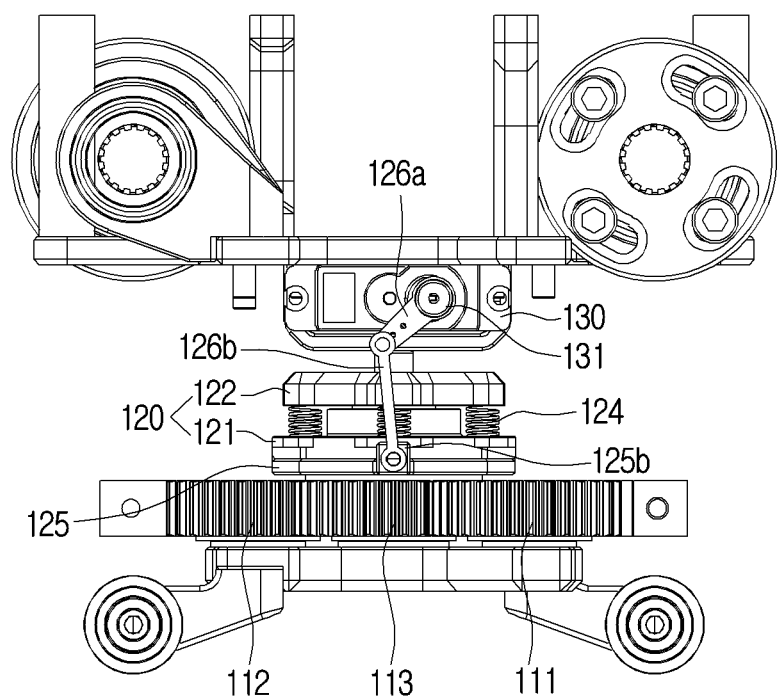
FIG. 12A is a view illustrating a state in which a pinion of a locking device of a vehicle for uneven terrain according to an embodiment is locked and is unable to rotate.
Figure 12B:
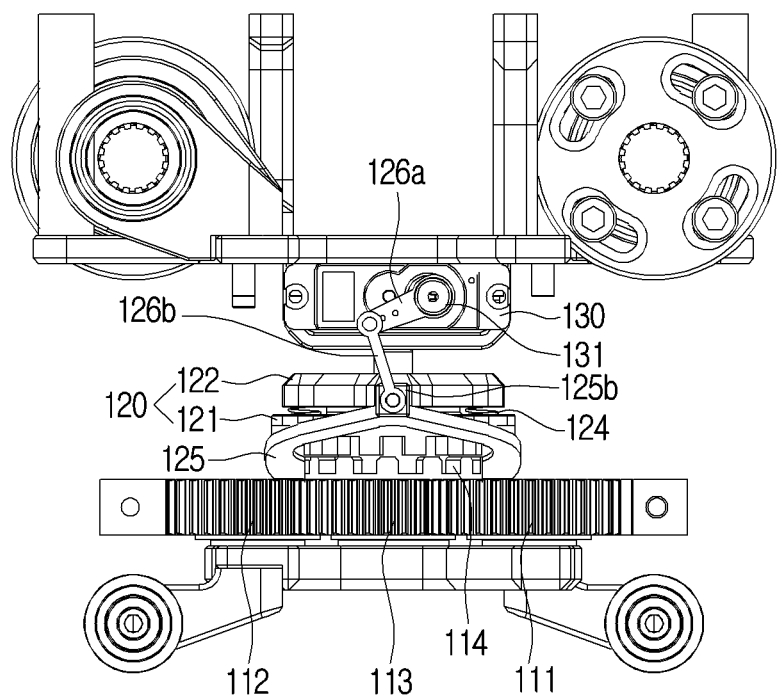
FIG. 12B is a view illustrating a state in which a pinion of a locking device of a vehicle for uneven terrain according to an embodiment is released and is able to rotate.

FIG. 10 is a perspective view illustrating a locking device of a vehicle for uneven terrain according to an embodiment. FIG. 11 is a partial bottom view illustrating racks and pinions of a locking device of a vehicle for uneven terrain according to an embodiment. FIG. 12A is a view illustrating a state in which a pinion of a locking device of a vehicle for uneven terrain according to an embodiment is locked so that the pinion is unable to rotate. FIG. 12B is a view illustrating a state in which a pinion of a locking device of a vehicle for uneven terrain according to an embodiment is released so that the pinion is able to rotate. For reference, FIG. 11 is a partial bottom view viewed from the bottom up in a state in which the lower frame is removed to show the arrangement relationship of a pair of racks and at least one pinion of a vehicle for uneven terrain according to an embodiment.

Referring to FIGS. 10 and 11, the locking device 100 according to an embodiment may include a lifting stopper 120 and an actuator 130.

The lifting stopper 120 may be formed to prevent the pair of racks (e.g., the front wheel rack 101 and the rear wheel rack 102) from moving by selectively blocking the rotation of at least one pinion (e.g., at least one of the first to third pinions 111, 112, and 113) disposed in the wheelbase adjuster 20. In other words, the lifting stopper 120 may be configured to selectively lock at least one pinion (e.g., at least one of the first to third pinions 111, 112, and 113).

For example, the lifting stopper 120 may include a moving plate 121 and a fixed plate 122.

The fixed plate 122 may be disposed to be fixed to the main frame 10. In this embodiment, the fixed plate 122 is disposed under the actuator 130, and is fixed with respect to the actuator 130.

The moving plate 121 is disposed under the fixed plate 122 and is spaced apart from the fixed plate 122 by a predetermined distance. The moving plate 121 may be formed to move up and down with respect to the fixed plate 122. In addition, the moving plate 121 may be disposed so that the moving plate 121 does not rotate with respect to the fixed plate 122.

The moving plate 121 may move up and down with respect to the third pinion 113 by the actuator 130. A plurality of coupling protrusions 123 may be provided on a bottom surface of the moving plate 121 in a circular shape. In other words, the plurality of coupling protrusions 123 may be spaced apart from each other at regular intervals along a circle having a predetermined diameter.

A plurality of elastic members 124 may be provided between the moving plate 121 and the fixed plate 122. The plurality of elastic members 124 press the moving plate 121 downward to prevent the plurality of coupling protrusions 123 of the moving plate 121 from falling out of a plurality of coupling grooves 114 of the third pinion 113.

The plurality of coupling grooves 114 may be provided on the upper surface of the third pinion 113. The plurality of coupling grooves 114 may be arranged at regular intervals in a circular shape. The plurality of coupling grooves 114 may be formed in a shape corresponding to the plurality of coupling protrusions 123 of the moving plate 121.

Accordingly, the plurality of coupling grooves 114 of the third pinion 113 may be engaged with the plurality of coupling protrusions 123 of the moving plate 121. When the plurality of coupling protrusions 123 of the moving plate 121 are engaged with the plurality of coupling grooves 114 of the third pinion 113, the third pinion 113 is unable to rotate.

The lifting stopper 120 may include an actuating part 125 and an actuating link 126 for actuating the moving plate 121.

The actuating link 126 may connect the actuating part 125 and the actuator 130 so that the actuating part 125 may be rotated up and down by a predetermined angle by the actuator 130.

The actuator 130 may be configured to move the lifting stopper 120 up and down. The actuator 130 may be fixed to the main frame 10 above the fixed plate 122. The actuator 130 may include a rotation shaft 131 that rotates at a predetermined angle. As the actuator 130, a rotating cylinder, a motor, or the like may be used.

The actuating part 125 may be formed to move the moving plate 121 up and down. For example, the actuating part 125 may be disposed under the moving plate 121 and formed in a substantially U-shape surrounding the plurality of coupling protrusions 123 of the moving plate 121. Both ends of the actuating part 125, that is, both ends of the U-shape may be pivotally disposed on the lower frame 12. In other words, both ends of the actuating part 125 may be pivotally coupled to fixing bars 12a fixed to the lower frame 12. Accordingly, the actuating part 125 may pivot a predetermined angle on both ends of the actuating part 125 coupled to the fixing bars 12a.

A connecting portion 125b to which the actuating link 126 is connected may be provided at one end of the actuating part 125, that is, at the lower end of the U-shape. The actuating link 126 may be rotatably connected to the connecting portion 125b of the actuating part 125.

The actuating link 126 may be formed to connect the connecting portion 125b of the lower end of the actuating part 125 and the rotation shaft 131 of the actuator 130. To this end, the actuating link 126 may be formed as a two-bar linkage. For example, the actuating link 126 may include a driving link 126a having one end connected to the rotation shaft 131 of the actuator 130, and a driven link 126b having one end connected to the connecting portion 125b of the actuating part 125. The other end of the driving link 126a and the other end of the driven link 126b are connected by a pin. Accordingly, the driving link 126a and the driven link 126b may rotate with respect to each other.

Accordingly, when the rotation shaft 131 of the actuator 130 rotates at a certain angle, the connecting portion 125b of the actuating part 125 is raised upward by the actuating link 126 as illustrated in FIG. 12B. At this time, because both ends of the actuating part 125 are fixed to the lower frame 12, the actuating part 125 pivots upward at a predetermined angle on the both ends of the actuating part 125.

Then, the moving plate 121 is moved upward by the actuating part 125, so that the plurality of coupling protrusions 123 of the moving plate 121 fall out of the plurality of coupling grooves 114 of the third pinion 113. At this time, the plurality of elastic members 124 positioned between the moving plate 121 and the fixed plate 122 are compressed by the moving plate 121.

When the plurality of coupling protrusions 123 of the moving plate 121 are separated from the plurality of coupling grooves 114 of the third pinion 113 as described above, the third pinion 113 is able to rotate freely. Accordingly, the front wheel rack 101 and the rear wheel rack 102 connected to the third pinion 113 through the first pinion 111 and the second pinion 112 may move freely.

In this case, because the front wheel moving part 50 in which the front wheel rack 101 is disposed and the rear wheel moving part 80 in which the rear wheel rack 102 is disposed are able to move, the front wheel assembly 60 connected to the front wheel moving part 50 and the rear wheel assembly 90 connected to the rear wheel moving part 80 may also move. Accordingly, when the front wheel 41 disposed in the front wheel assembly 60 and the rear wheel 71 disposed in the rear wheel assembly 90 move, the wheelbase D between the front wheel 41 and the rear wheel 71 may be adjusted.

In this state, when the rotation shaft 131 of the actuator 130 rotates by a predetermined angle in the opposite direction, as illustrated in FIG. 12A, the actuating part 125 is lowered by the actuating link 126. Then, the moving plate 121 is lowered so that the plurality of coupling protrusions 123 of the moving plate 121 are engaged with the plurality of coupling grooves 114 of the third pinion 113. At this time, the plurality of coupling protrusions 123 of the moving plate 121 may be smoothly inserted into the plurality of coupling grooves 114 of the third pinion 113 by the elastic force of the plurality of elastic members 124.

When the moving plate 121 is lowered by the actuator 130 so that the plurality of coupling protrusions 123 are engaged with the plurality of coupling grooves 114 of the third pinion 113, the third pinion 113 is unable to rotate. Therefore, when the front wheel 41 and the rear wheel 71 rotate, the front wheel rack 101 of the front wheel moving part 50 and the rear wheel rack 102 of the rear wheel moving part 80 are unable to move. As a result, the wheelbase D between the front wheel 41 and the rear wheel 71 may not be adjusted.

In other words, as illustrated in FIG. 12A, when the locking device 100 operates to lock the front wheel rack 101 of the front wheel moving part 50 and the rear wheel rack 102 of the rear wheel moving part 80, the front wheel moving part 50 and the rear wheel moving part 80 may not move linearly with respect to the main frame 10. Then, the front wheel assembly 60 connected to the front wheel moving part 50 and the rear wheel assembly 90 connected to the rear wheel moving part 80 may not move either. Accordingly, the wheelbase D between the front wheel 41 disposed in the front wheel assembly 60 and the rear wheel 71 disposed in the rear wheel assembly 90 does not change.

Conversely, as illustrated in FIG. 12B, when the locking device 100 is released to allow the third pinion 113 to rotate, the front wheel rack 101 of the front wheel moving part 50 and the rear wheel rack 102 of the rear wheel moving part 80 may move along the third pinion 113. Accordingly, the front wheel assembly 60 and the rear wheel assembly 90 may linearly move back and forth with respect to the main frame 10. As a result, the wheelbase D between the front wheel 41 and the rear wheel 71 may change according to the rotation direction of each of the front wheel 41 and the rear wheel 71.

In detail, when the front wheel 41 rotates in one direction, for example, in the counter-clockwise direction to move in front of the main frame 10, that is, in a direction away from the main frame 10 and the rear wheel 71 rotates in the direction opposite to the front wheel 41, for example, in the clockwise direction to move to the rear of the main frame 10, that is, in a direction away from the main frame 10, the front wheel assembly 60 and the rear wheel assembly 90 move forward and rearward of the main frame 10, respectively, so that the wheelbase D between the front wheel 41 and the rear wheel 71 is increased.

Conversely, when the front wheel 41 rotates in the opposite direction, for example, in the clockwise direction to move in a direction closer to the main frame 10 and the rear wheel 71 rotates in the direction opposite to the front wheel 41, for example, in the counter-clockwise direction to move in a direction closer to the main frame 10, both the front wheel assembly 60 and the rear wheel assembly 90 move toward the main frame 10, so that the wheelbase D between the front wheel 41 and the rear wheel 71 is reduced.

Hereinafter, a state in which the wheelbase D between the front wheel 41 and the rear wheel 71 in a vehicle 1 for uneven terrain according to an embodiment is maximized will be described with reference to FIGS. 13 to 16.

Figure 13:
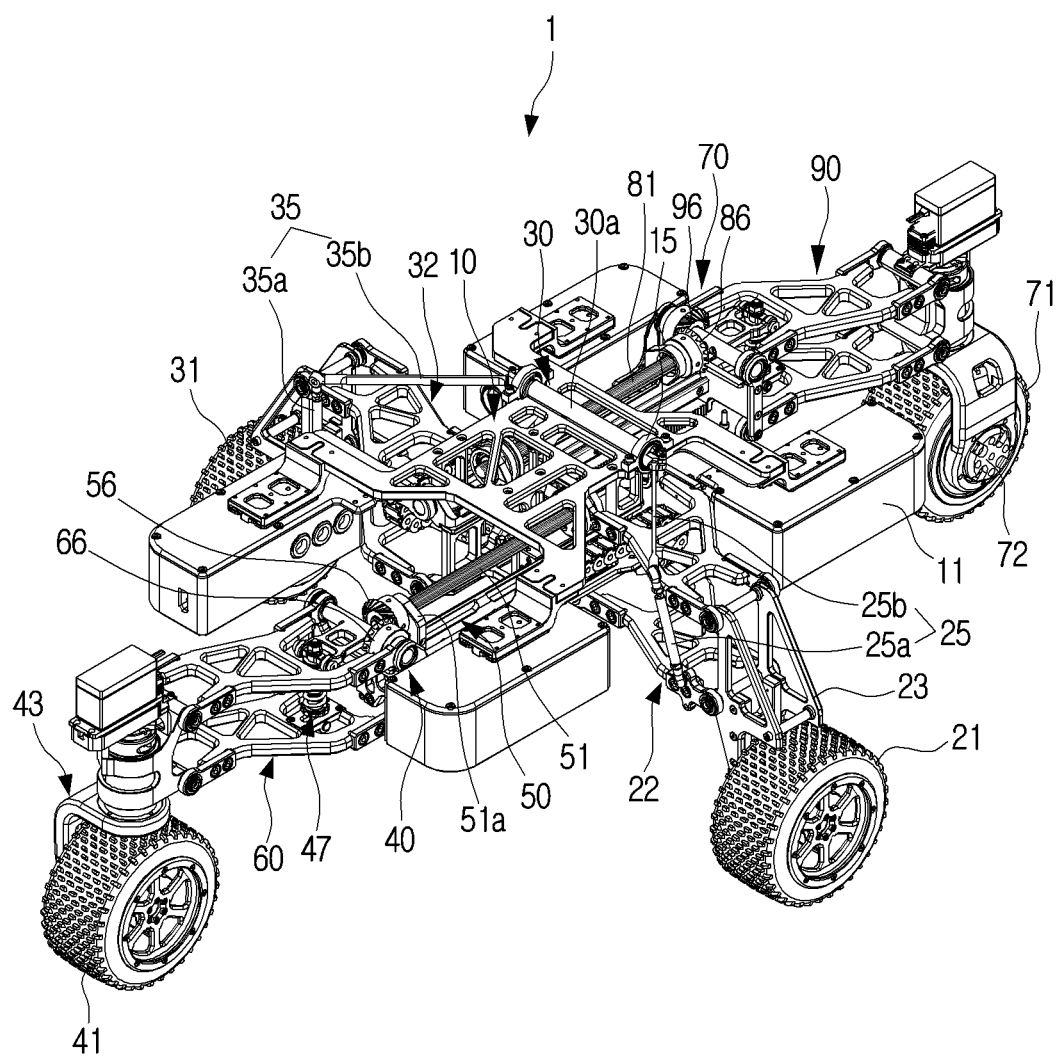
FIG. 13 is a perspective view illustrating a state in which a wheelbase of a vehicle for uneven terrain according to an embodiment is maximized.
Figure 14:
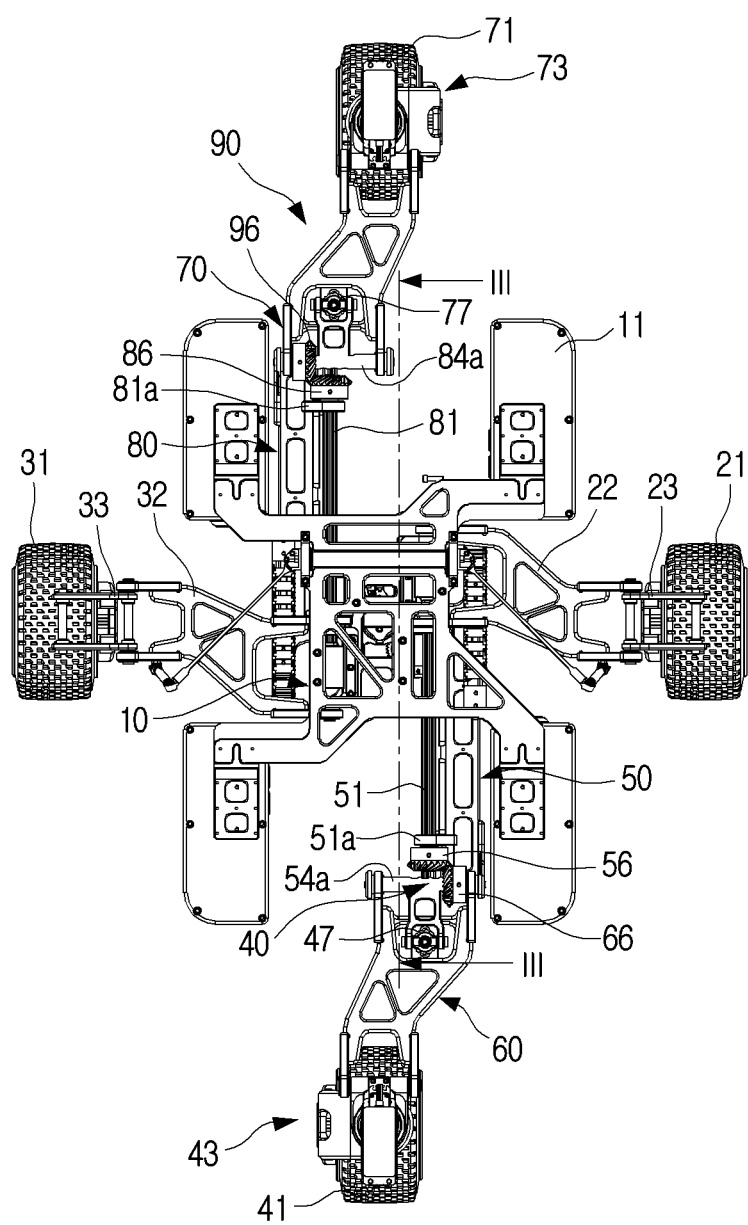
FIG. 14 is a plan view of the vehicle for uneven terrain of FIG. 13.
Figure 15:
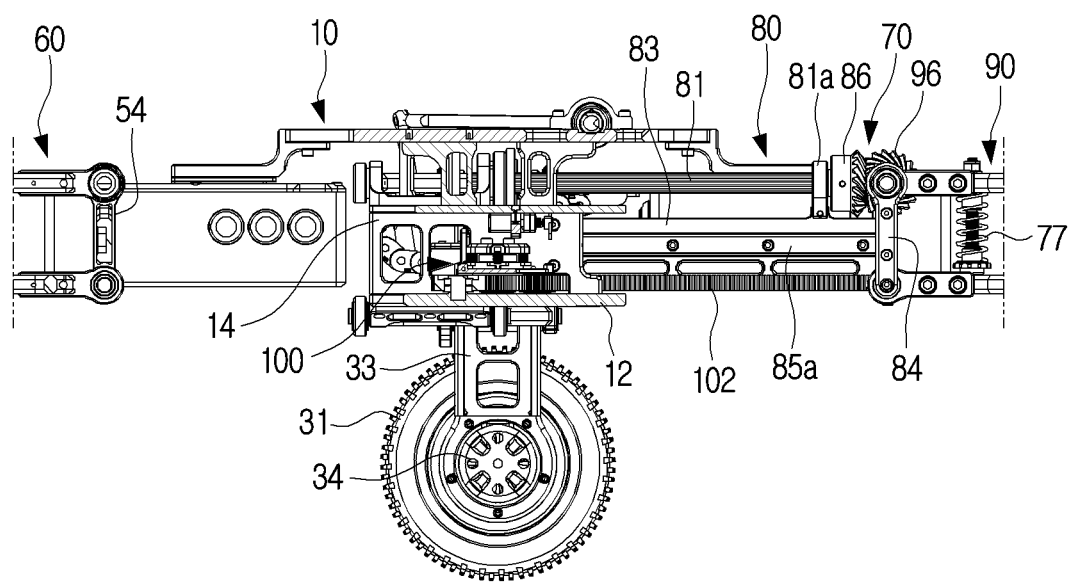
FIG. 15 is a partial cross-sectional view illustrating the vehicle for uneven terrain of FIG. 13 taken along line III-III.
Figure 16:
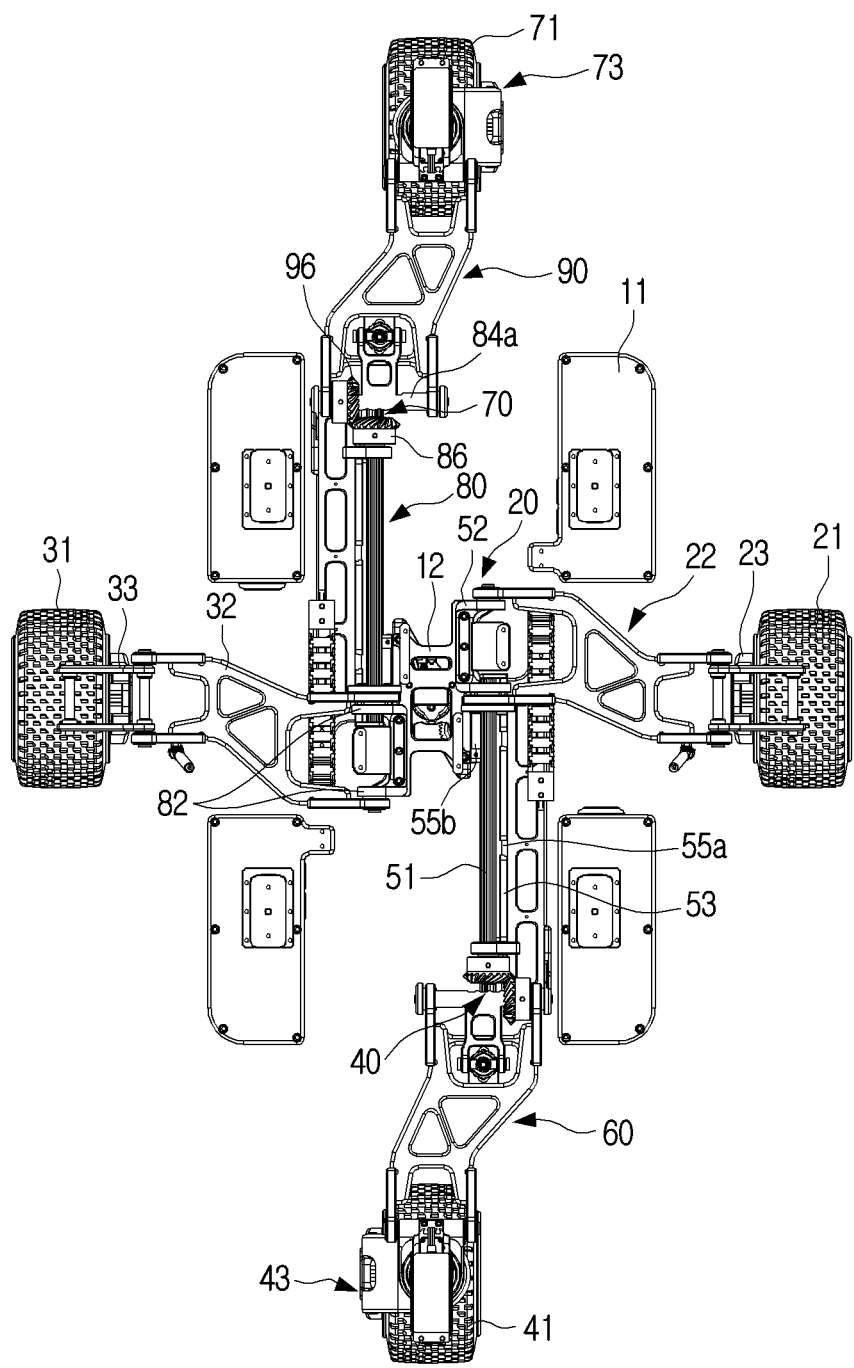
FIG. 16 is a plan view illustrating a state in which a main frame is removed from the vehicle for uneven terrain of FIG. 13.

FIG. 13 is a perspective view illustrating a state in which a wheelbase of a vehicle for uneven terrain according to an embodiment is maximized. FIG. 14 is a plan view of the vehicle for uneven terrain of FIG. 13. FIG. 15 is a partial cross-sectional view illustrating the vehicle for uneven terrain of FIG. 13 taken along line FIG. 16 is a plan view illustrating a state in which a main frame is removed from the vehicle for uneven terrain of FIG. 13.

As illustrated in FIGS. 13 to 16, when the front wheel 41 rotates in one direction so that the front wheel assembly 60 linearly moves forward to the maximum with respect to the main frame 10, the rear end of the front wheel moving part 50 connected to the front wheel assembly 60, that is, the rear end of the front wheel moving base 53 contacts the block 55b of the LM guide 55. In this state, the front wheel assembly 60 may not move further forward with respect to the main frame 10.

In this case, the spline shaft 51 of the front wheel moving part 50 maintains a coupled state with one boss adjacent to the front wheel 41 among the pair of bosses 52 fixed to the lower frame 12. In addition, the front wheel rack 101 of the front wheel moving part 50 maintains a state engaged with the first pinion 111 of the locking device 100.

On the other hand, when the rear wheel 71 rotates in the opposite direction to the front wheel 41 so that the rear wheel assembly 90 linearly moves backward to the maximum with respect to the main frame 10, the front end of the rear wheel moving part 80 connected to the rear wheel assembly 90, that is, the front end of the rear wheel moving base 83 contacts the block 85b of the LM guide 85. In this state, the rear wheel assembly 90 may not move further rearward with respect to the main frame 10.

In this case, the spline shaft 81 of the rear wheel moving part 80 maintains a coupled state with one boss adjacent to the rear wheel 71 among the pair of bosses 82 fixed to the lower frame 12. In addition, the rear wheel rack 102 of the rear wheel moving part 80 maintains a state engaged with the second pinion 112 of the locking device 100.

In this state, when the locking device 100 operates to lock the front wheel rack 101 of the front wheel moving part 50 and the rear wheel rack 102 of the rear wheel moving part 80, the front wheel assembly 60 and the rear wheel assembly 90 do not move relative to the main frame 10. Therefore, the wheelbase D between the front wheel 41 and the rear wheel 71 may be maintained.

In this case, the distance between the first side wheel 21 and the second side wheel 31 may be kept constant. In other words, the distance between the first side wheel 21 and the second side wheel 31 does not change and remains the same in both the case where the wheelbase D between the front wheel 41 and the rear wheel 71 is the largest and the case where the wheelbase D therebetween is the smallest.

When it is desired to reduce the wheelbase D in a state in which the wheelbase D is maximum as illustrated in FIG. 13, the front wheel 41 and the rear wheel 71 are rotated in opposite directions.

In detail, the front wheel 41 rotates in the opposite direction, for example, in the clockwise direction to move to the rear of the main frame 10, that is, in a direction closer to the main frame 10, and the rear wheel 71 rotates in the opposite direction to the front wheel 41, for example, in the counter-clockwise direction to move toward the front of the main frame 10, that is, in a direction closer to the main frame 10, so that the wheelbase D is reduced.

Figure 17:
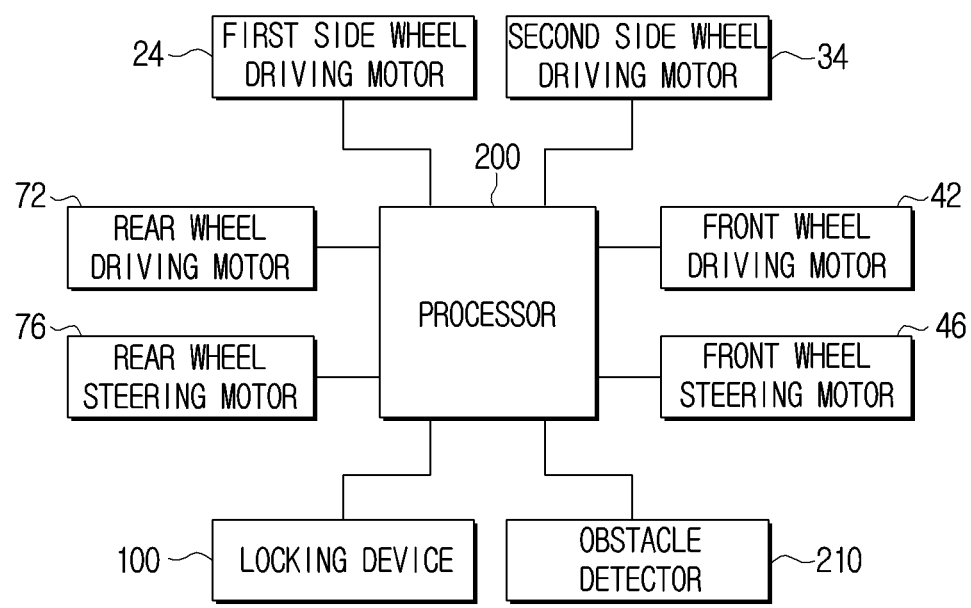
FIG. 17 is a block diagram illustrating a vehicle for uneven terrain according to an embodiment.

FIG. 17 is a block diagram illustrating a vehicle for uneven terrain according to an embodiment.

Referring to FIG. 17, a vehicle 1 for uneven terrain according to an embodiment may include a first side wheel driving motor 24, a second side wheel driving motor 34, a front wheel driving motor 42, a front wheel steering motor 46, a rear wheel driving motor 72, a rear wheel steering motor 76, a locking device 100, an obstacle detector 210, and a processor 200.

The first side wheel driving motor 24 and the second side wheel driving motor 34 are electrically connected to the processor 200. The first side wheel driving motor 24 and the second side wheel driving motor 34 rotate the first side wheel 21 and the second side wheel 31 under the control of the processor 200, respectively.

The front wheel driving motor 42 and the rear wheel driving motor 72 are electrically connected to the processor 200. The front wheel driving motor 42 and the rear wheel driving motor 72 rotate the front wheel 41 and the rear wheel 71 under the control of the processor 200, respectively.

The front wheel steering motor 46 is electrically connected to the processor 200 and controls the moving direction of the front wheel 41 according to the control of the processor 200.

The rear wheel steering motor 76 is electrically connected to the processor 200 and controls the moving direction of the rear wheel 71 according to the control of the processor 200.

The locking device 100 is electrically connected to the processor 200, and allows the front wheel moving part 50 and the rear wheel moving part 80 to be selectively fixed to the main frame 10 according to the control of the processor 200. In detail, the actuator 130 of the locking device 100 is electrically connected to the processor 200 and operates under the control of the processor 200 so that the lifting stopper 120 may selectively lock the third pinion 113.

When the actuator 130 raises the moving plate 121 of the lifting stopper 120, the plurality of coupling protrusions 123 of the moving plate 121 are separated from the plurality of coupling grooves 114 of the third pinion 113. Then, the third pinion 113 may rotate, so that the front wheel moving part 50 and the rear wheel moving part 80 may move back and forth with respect to the main frame 10.

When the actuator 130 lowers the moving plate 121 of the lifting stopper 120, the plurality of coupling protrusions 123 of the moving plate 121 engage with the plurality of coupling grooves 114 of the third pinion 113. Then, the third pinion 113 is locked and may not rotate. As a result, the front wheel moving part 50 and the rear wheel moving part 80 may not move back and forth with respect to the main frame 10.

The obstacle detector 210 is electrically connected to the processor 200 and is configured to detect the positions and sizes of obstacles to be climbed by the vehicle 1 for uneven terrain. The obstacle detector 210 may transmit information on the position and size of the detected obstacle to the processor 200.

For example, the obstacle detector 210 may detect the position and size of the stairs to be climbed by the vehicle 1 for uneven terrain. The obstacle detector 210 may detect the size of the stairs and transmit the size information of the stairs to the processor 200. The size information of the stairs may include a step height, a step width an edge interval, and a width of the stairs.

The obstacle detector 210 may be implemented using a three dimensional (3D) depth camera (or sensor), a 3D-light detection and ranging (LiDAR) sensor, or the like, capable of recognizing an obstacle in three dimensions.

As another example, the obstacle detector 210 may be implemented using two LiDARs capable of detecting line information. For example, after installing two LiDARs vertically, an obstacle may be extracted by combining line information detected by the two LiDARs.

The processor 200 may be configured to control the front wheel driving motor 42, the rear wheel driving motor 72, the first side wheel driving motor 24, the second side wheel driving motor 34, the front wheel steering motor 46, and the rear wheel steering motor 76 to move the vehicle 1 for uneven terrain.

In addition, the processor 200 may be configured to adjust the wheelbase D between the front wheel 41 and the rear wheel 71 by controlling the locking device 100, the front wheel driving motor 42, and the rear wheel driving motor 72 according to the size information of the obstacle input from the obstacle detector 210.

For example, when meeting the stairs, the processor 200 measures the size of the stairs using the obstacle detector 210. The processor 200 may calculate the step height, the step width, and the edge interval of the stairs from the size information of the stairs input from the obstacle detector 210, and may determine whether the stairs can be climbed with the current wheelbase D. Here, the edge interval of the stairs refers to the spacing between two adjacent edges measured on a straight line connecting the edges of a plurality of steps constituting the stairs. When the wheelbase D is equal to a multiple of the edge interval, the vehicle 1 for uneven terrain may not climb the stairs.

When it is determined that the vehicle 1 for uneven terrain is unable to climb the stairs because the current wheelbase D is short, the processor 200 controls the locking device 100, the front wheel driving motor 42, and the rear wheel driving motor 72 to increase the wheelbase D.

To this end, the processor 200 first operates the locking device 100 to allow the third pinion 113 to rotate. For example, the processor 200 may operate the actuator 130 of the locking device 100 to raise the moving plate 121. When the moving plate 121 is raised, the plurality of coupling protrusions 123 of the moving plate 121 are separated from the plurality of coupling grooves 114 of the third pinion 113, so that the third pinion 113 may rotate.

In this state, the processor 200 may control the front wheel driving motor 42 and the rear wheel driving motor 72 so that the front wheel 41 moves in front of the main frame 10 and the rear wheel 71 moves toward the rear of the main frame 10. Then, the front wheel assembly 60 moves toward the front of the main frame 10 and the rear wheel assembly 90 moves toward the rear of the main frame 10 so that the wheelbase D between the front wheel 41 and the rear wheel 71 is increased.

When the wheelbase D1 (see FIG. 5) between the front wheel 41 and the first and second side wheels 21 and 23 is a multiple of about 1.4 to 1.5 of the edge interval of the stairs, the processor 200 stops the front wheel driving motor 42 and the rear wheel driving motor 72. When the wheelbase D1 between the front wheel 41 and the first and second side wheels 21 and 23 is a multiple of about 1.4 to 1.5 of the edge interval of the stairs, it may be prevented that the front wheel 41 and the first and second side wheels 31 and 32 are in contact with the vertical surfaces of the stairs at the same time.

In addition, because the front wheel 41 and the rear wheel 71 move the same distance, the wheelbase D2 (see FIG. 5) between the rear wheel 71 and the first and second side wheels 21 and 23 is equal to the wheelbase D1 between the front wheel 41 and the first and second side wheels 21 and 23. Accordingly, it may be prevented that the rear wheel 71 and the first and second side wheels 21 and 23 are simultaneously in contact with the vertical surfaces of the stairs.

Therefore, because the front wheel 41 and the side wheels 21 and 23 or the rear wheel 71 and the side wheels 21 and 23 do not contact the vertical surfaces of the stairs at the same time, the vehicle 1 for uneven terrain according to an embodiment may climb the stairs easily.

The processor 200 stops the front wheel driving motor 42 and the rear wheel driving motor 72 and then controls the locking device 100 to lock the third pinion 113 so that the third pinion 113 does not rotate.

For example, the processor 200 may operate the actuator 130 of the locking device 100 to lower the moving plate 121. When the moving plate 121 is lowered, the plurality of coupling protrusions 123 of the moving plate 121 are engaged with the plurality of coupling grooves 114 of the third pinion 113. When the plurality of coupling protrusions 123 of the moving plate 121 and the plurality of coupling grooves 114 of the third pinion 113 are engaged with each other, the third pinion 113 is locked and may not rotate freely.

Therefore, when the front wheel 41 and the rear wheel 71 rotate, the front wheel assembly 60 and the rear wheel assembly 90 do not move with respect to the main frame 10, so the wheelbase D between the front wheel 41 and the rear wheel 71 does not change.

As described above, the vehicle for uneven terrain according to an embodiment may prevent the front wheel and the side wheels from simultaneously contacting the vertical surface of the stairs by adjusting the wheelbase between the front wheel and the rear wheel according to the size of the stairs. Therefore, the vehicle for uneven terrain according to an embodiment may easily climb stairs of various sizes.

Hereinabove, non-limiting example embodiments of the present disclosure have been described. It is to be understood that terms used herein are provided to describe example embodiments and do not limit the disclosure. Various modifications and alternations of example embodiments of the disclosure may be made according to the contents described above.

What is claimed is:

1. A vehicle comprising:
   a main frame;
   a front wheel assembly disposed in front of the main frame and comprising a front wheel;
   a rear wheel assembly disposed behind the main frame and comprising a rear wheel;
   a wheelbase adjuster disposed between the front wheel assembly and the rear wheel assembly and configured to adjust a wheelbase between the front wheel and the rear wheel;
   a first side wheel assembly pivotably disposed on one side of the main frame and comprising a first side wheel;
   a second side wheel assembly pivotably disposed on another side of the main frame and comprising a second side wheel that is opposite to the first side wheel;
   a front wheel torque transmitter configured to interlock a vertical movement of the front wheel and a vertical movement of the first side wheel;
   a rear wheel torque transmitter configured to interlock a vertical movement of the rear wheel and a vertical movement of the second side wheel; and
   a stabilizer disposed in the main frame and configured to support the first side wheel assembly and the second side wheel assembly so that the first side wheel and the second side wheel are positioned at a same height.

2. The vehicle as claimed in claim 1, wherein the wheelbase adjuster comprises:
   a front wheel moving part configured to linearly move the front wheel assembly; and
   a rear wheel moving part disposed in parallel to the front wheel moving part and configured to linearly move the rear wheel assembly.

3. The vehicle as claimed in claim 2, wherein each of the front wheel moving part and the rear wheel moving part comprises a linear motion guide.

4. The vehicle as claimed in claim 3, wherein the front wheel moving part comprises a front wheel rack disposed under the linear motion guide of the front wheel moving part,
   wherein the rear wheel moving part comprises a rear wheel rack disposed in parallel and opposite to the front wheel rack, and
   wherein at least one pinion is disposed between the front wheel rack and the rear wheel rack.

5. The vehicle as claimed in claim 3, wherein the front wheel torque transmitter comprises:
   a spline shaft disposed parallel to and above the linear motion guide of the front wheel moving part;
   a first front wheel bevel gear disposed at a leading end of the spline shaft; and
   a second front wheel bevel gear disposed at a rear end of the front wheel assembly and meshed with the first front wheel bevel gear.

6. The vehicle as claimed in claim 5, wherein the front wheel assembly is pivotably disposed at a front end of the front wheel moving part,
   wherein the second front wheel bevel gear is configured to rotate integrally with the front wheel assembly, and
   wherein the front wheel is rotatably disposed at a front end of the front wheel assembly.

7. The vehicle as claimed in claim 3, wherein the rear wheel torque transmitting device comprises:
   a spline shaft disposed parallel to and above the linear motion guide of the rear wheel moving part;
   a first rear wheel bevel gear disposed at a leading end of the spline shaft; and
   a second rear wheel bevel gear disposed at a front end of the rear wheel assembly and meshed with the first rear wheel bevel gear.

8. The vehicle as claimed in claim 7, wherein the rear wheel assembly is pivotably disposed at a rear end of the rear wheel moving part,
   wherein the second rear wheel bevel gear is configured to rotate integrally with the rear wheel assembly, and
   wherein the rear wheel is rotatably disposed at a rear end of the rear wheel assembly.

9. The vehicle as claimed in claim 2, further comprising:
   a front shock absorber disposed between the front wheel moving part and the front wheel assembly.

10. The vehicle as claimed in claim 2, further comprising:
    a rear shock absorber disposed between the rear wheel moving part and the rear wheel assembly.

11. The vehicle as claimed in claim 2, wherein the front wheel moving part comprises a first linear motion guide that comprises a block and a rail,
    the rear wheel moving part comprises a second linear motion guide that comprises a block and a rail,
    wherein the block of the first linear motion guide and the block of the second linear motion guide are disposed on the main frame, and
    wherein the front wheel assembly is pivotably disposed at one end of the rail of the first linear motion guide, and the rear wheel assembly is pivotably disposed at one end of the rail of the second linear motion guide.

12. The vehicle as claimed in claim 2, wherein the wheelbase adjuster further comprises a locking device configured to lock the front wheel moving part and the rear wheel moving part such that a size of the wheelbase becomes fixed.

13. The vehicle as claimed in claim 12, wherein the front wheel moving part comprises a front wheel rack,
    wherein the rear wheel moving part comprises a rear wheel rack disposed parallel and opposite to the front wheel rack,
    wherein at least one pinion is disposed between the front wheel rack and the rear wheel rack, and
    wherein the locking device is configured to selectively lock the at least one pinion.

14. The vehicle as claimed in claim 13, wherein the locking device comprises:

a lifting stopper configured to selectively lock the at least one pinion; and
an actuator configured to move the lifting stopper up and down.

15. The vehicle as claimed in claim 14, wherein the at least one pinion comprises a plurality of coupling grooves provided on an upper surface thereof,
wherein the lifting stopper comprises:
a moving plate configured to be moved up and down by the actuator and comprising a plurality of coupling protrusions that are configured to engage with the plurality of coupling grooves;
a fixed plate disposed above the moving plate and spaced apart from the moving plate by a predetermined distance; and
a plurality of elastic members provided between the moving plate and the fixed plate, and
wherein based on the moving plate being lowered by the actuator and the plurality of coupling protrusions being engaged with the plurality of coupling grooves of the at least one pinion, the at least one pinion is locked so as to not rotate.

16. A vehicle comprising:
a main frame;
a front wheel assembly disposed in front of the main frame and comprising a front wheel;
a rear wheel assembly disposed behind the main frame and comprising a rear wheel;
a wheelbase adjuster disposed between the front wheel assembly and the rear wheel assembly and configured to adjust a wheelbase between the front wheel and the rear wheel;
a first side wheel assembly pivotably disposed on one side of the main frame and comprising a first side wheel;
a second side wheel assembly pivotably disposed on another side of the main frame and comprising a second side wheel that is opposite to the first side wheel;
at least one motor configured to drive the front wheel and the rear wheel;
an obstacle detector configured to obtain size information of at least one step of stairs; and
at least one processor configured to:
obtain a size of at least one step of stairs based on the size information from the obstacle detector, and
adjust the wheelbase by controlling the at least one motor based on the size of the at least one step of stairs that is obtained.

17. The vehicle as claimed in claim 16, wherein the size of the at least one step of stairs obtained by the at least one processor is a step height, step width, or an edge interval of the stairs.

18. The vehicle as claimed in claim 17, wherein the at least one processor is further configured to control the at least one motor to adjust a wheelbase between the front wheel and the first and second side wheels to be a multiple of 1.4 to 1.5 of the edge interval based on the size information.

19. The vehicle as claimed in claim 16, wherein the at least one processor is further configured to drive the front wheel and the rear wheel in opposite directions to adjust the wheelbase.

20. The vehicle as claimed in claim 16, wherein the wheelbase adjuster comprises:
a front wheel moving part configured to linearly move the front wheel assembly;
a rear wheel moving part disposed in parallel to the front wheel moving part and configured to linearly move the rear wheel assembly; and
a locking device configured to fix a size of the wheelbase by locking the front wheel moving part and the rear wheel moving part, and
wherein the at least one processor is further configured to control the locking device to selectively lock the front wheel moving part and the rear wheel moving part.

* * * * *